United States Patent [19]

Kodama

[11] Patent Number: 5,475,429
[45] Date of Patent: Dec. 12, 1995

[54] IN-FOCUS SENSING DEVICE FOR SENSING AN IN-FOCUS CONDITION USING A RATIO OF FREQUENCY COMPONENTS AT DIFFERENT POSITIONS

[75] Inventor: Shinichi Kodama, Tokyo, Japan

[73] Assignee: Olympus Optical Co., Ltd., Tokyo, Japan

[21] Appl. No.: 338,271

[22] Filed: Nov. 14, 1994

Related U.S. Application Data

[63] Continuation of Ser. No. 912,151, Jul. 10, 1992, abandoned.

[30] Foreign Application Priority Data

| Jul. 25, 1991 | [JP] | Japan | 3-186360 |
| Aug. 16, 1991 | [JP] | Japan | 3-205848 |
| Sep. 17, 1991 | [JP] | Japan | 3-236636 |

[51] Int. Cl.$^6$ .................................... H04N 5/232
[52] U.S. Cl. ...................... 348/350; 348/355; 354/402
[58] Field of Search .................................. 348/345, 349, 348/350, 354, 355, 356; 354/402; H04N 5/232

[56] References Cited

U.S. PATENT DOCUMENTS

| 4,414,575 | 11/1983 | Yamamoto et al. | 358/227 |
| 4,484,806 | 11/1984 | Onishi et al. | 354/404 |
| 4,965,443 | 10/1990 | Yamasaki et al. | 250/201.7 |
| 4,967,280 | 10/1990 | Takuma et al. | 358/227 |
| 4,978,990 | 12/1990 | Yamasaki et al. | 354/432 |
| 4,990,947 | 2/1991 | Komiya et al. | 354/402 |
| 5,070,353 | 12/1991 | Komiya et al. | 358/227 X |
| 5,146,071 | 9/1992 | Ookubo et al. | 250/201.2 |
| 5,264,890 | 11/1993 | Komiya | 354/402 |

FOREIGN PATENT DOCUMENTS

| 55-87114 | 7/1980 | Japan . |
| 60-217759 | 10/1985 | Japan . |
| 63-127217 | 5/1988 | Japan . |
| 2-275916 | 11/1990 | Japan . |

OTHER PUBLICATIONS

NHK Technical Report, vol. 17, No. 1, pp. 21–37.

*Primary Examiner*—Wendy R. Greening
*Attorney, Agent, or Firm*—Frishauf, Holtz, Goodman, Langer & Chick

[57] ABSTRACT

In an in-focus sensing device for a camera, an optical system directs the luminous flux from the subject. An optoelectric transducer section converts the optical distribution of the luminous fluxes with different optical path lengths passing through the optical system, into an electrical distribution. A frequency extracting section extracts specific frequency components from each output of the optoelectric transducer section. A frequency component ratio sensing section obtains the ratio of two frequency components with different optical path lengths based on the output of the frequency extracting section. A defocus amount computing section obtains the defocus amount for the optical system based on the frequency component ratio. A driving section drives the optical system based on the defocus amount obtained. A frequency switching section sets a first frequency as the specific frequency at the frequency extracting section, and based on the frequency ratio for the first frequency, sets a second frequency as the specific frequency.

10 Claims, 32 Drawing Sheets

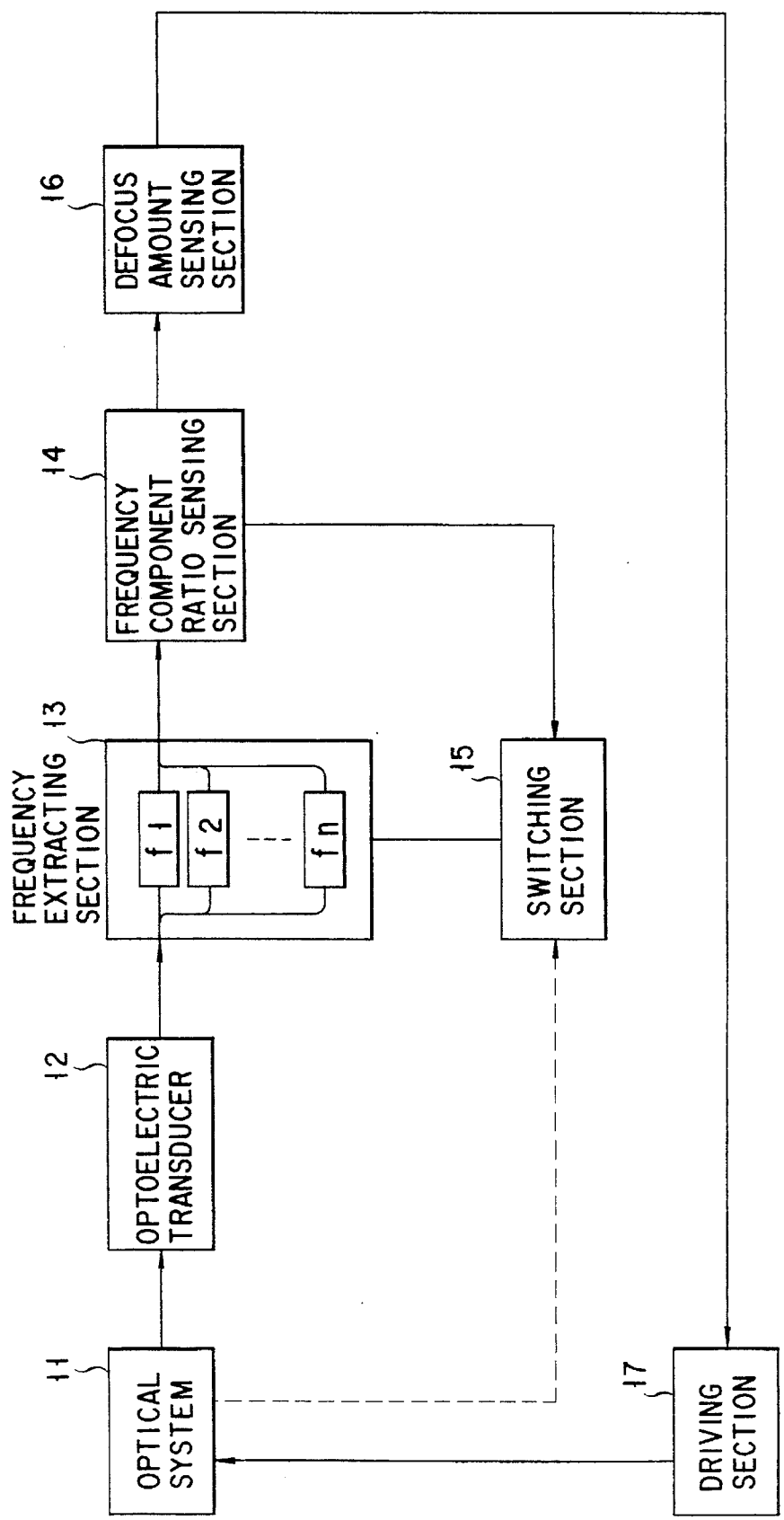
F I G. 1

F I G. 2A
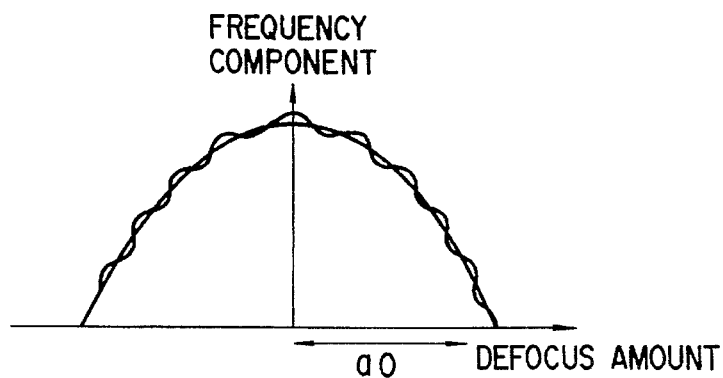
F I G. 2B
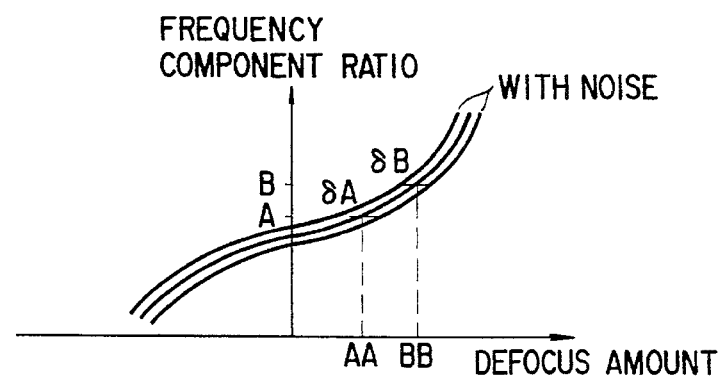
F I G. 2C
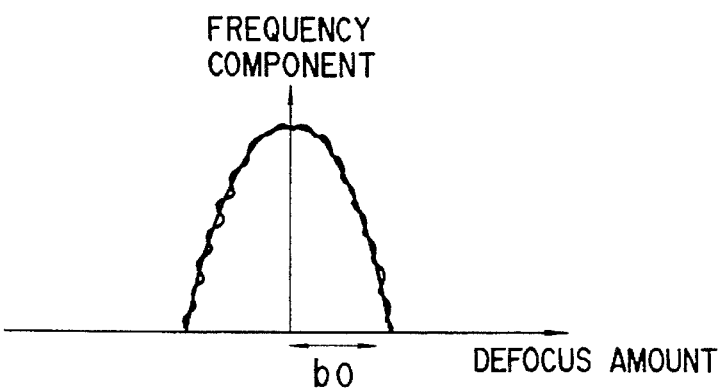
F I G. 2D
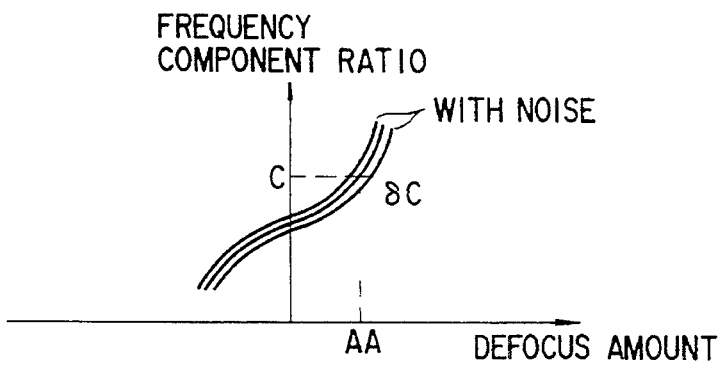

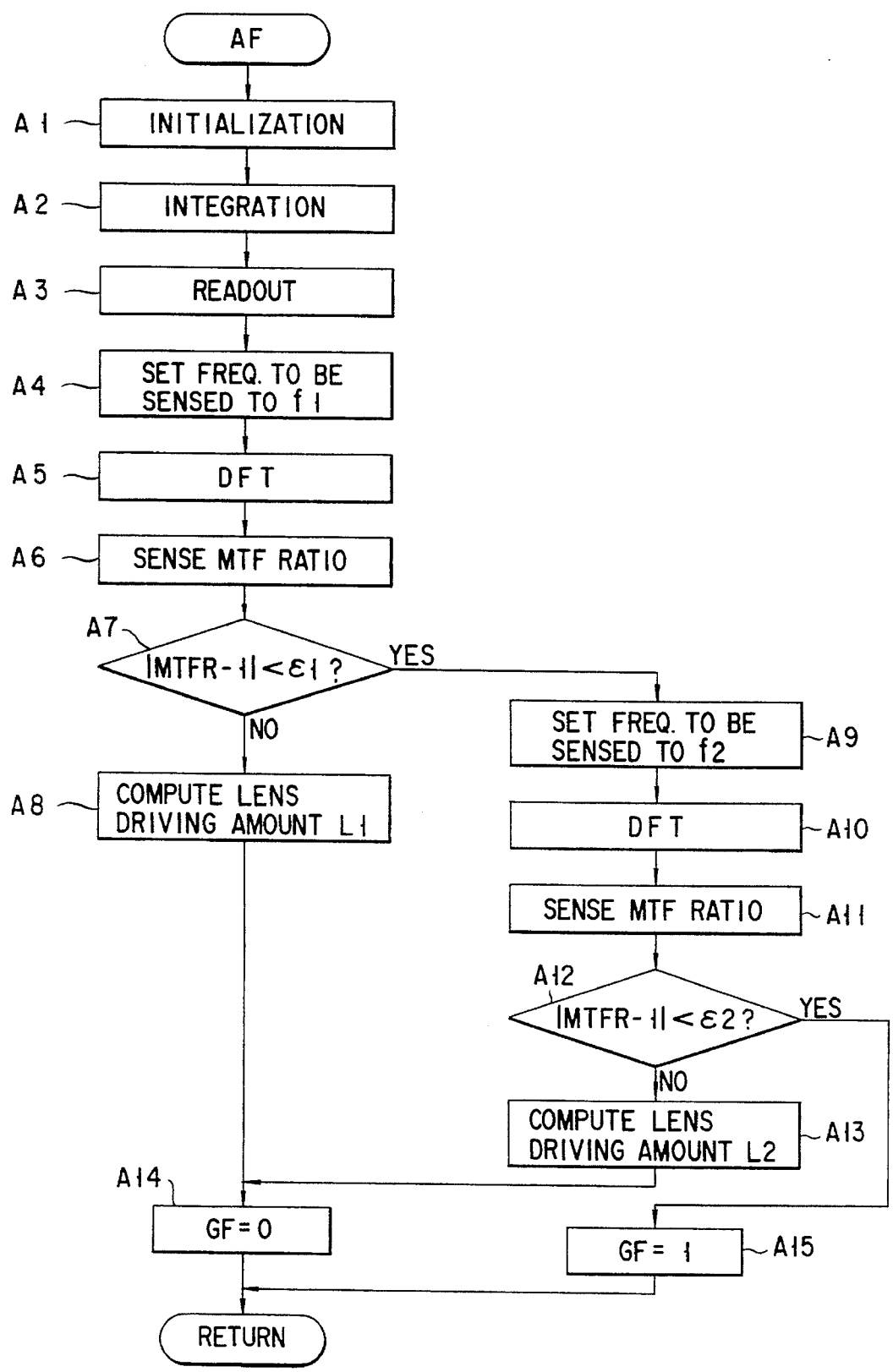
F I G. 6

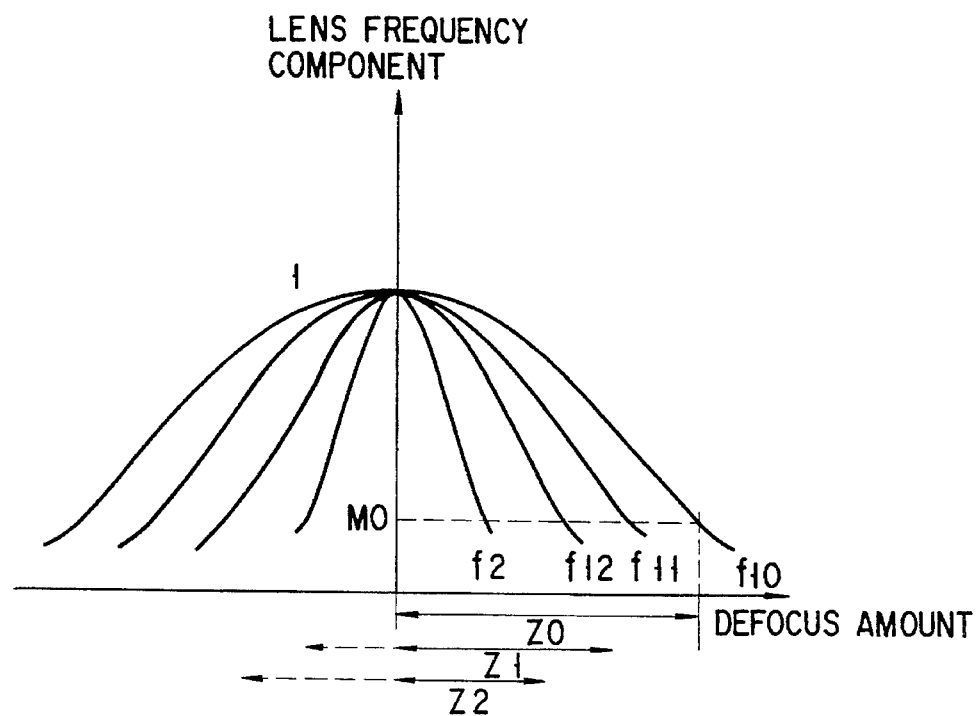
F I G. 7
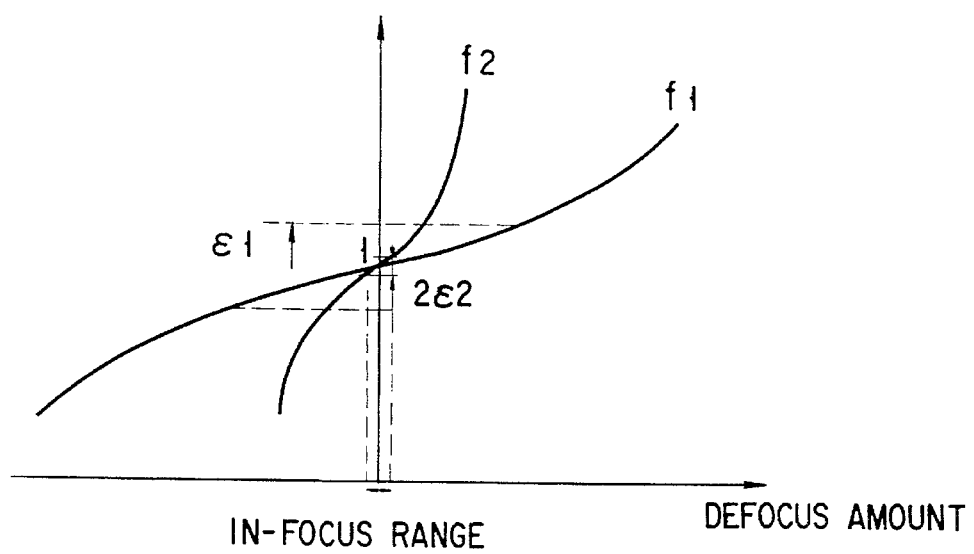
F I G. 8

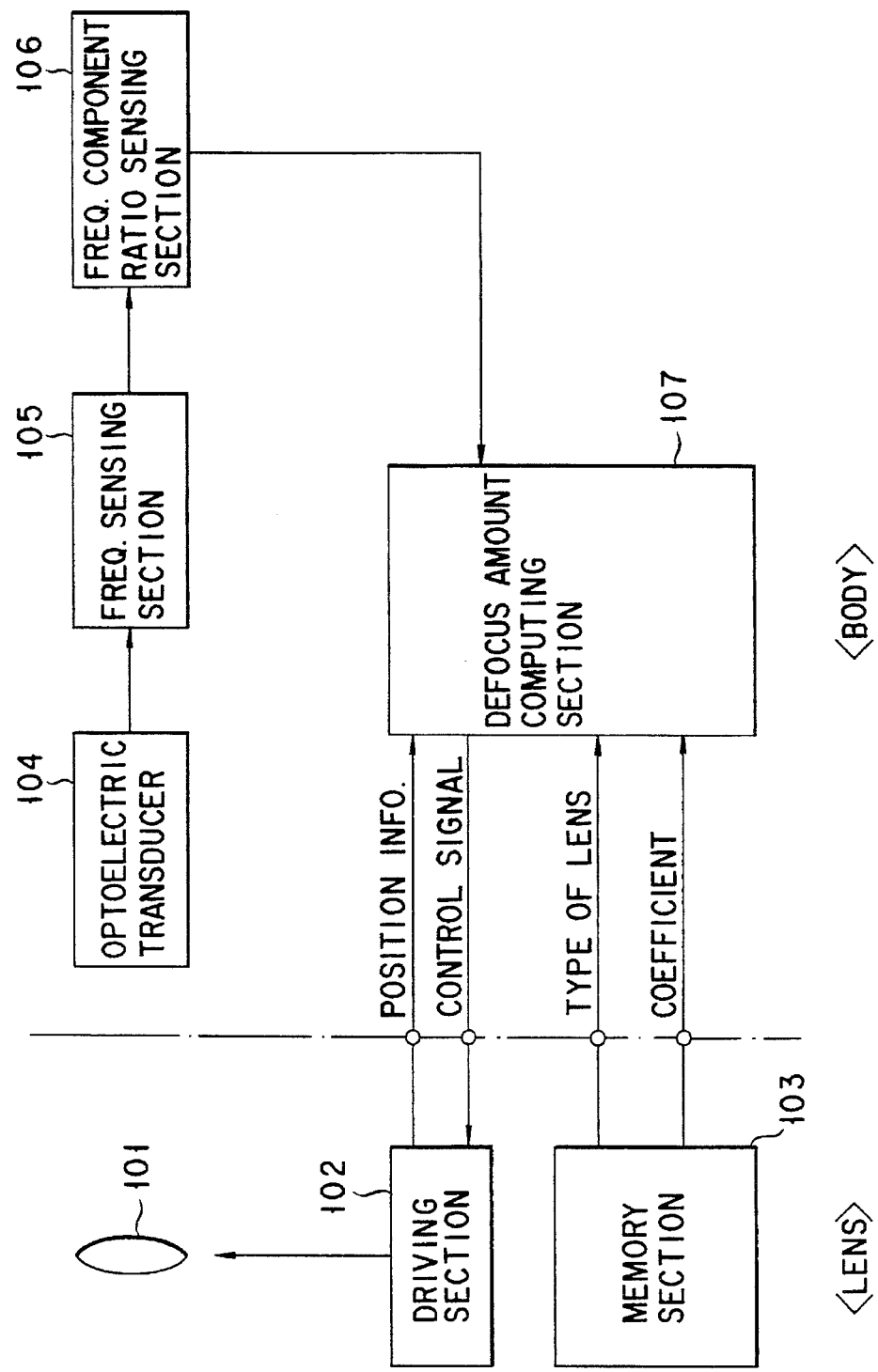
F I G. 13

| FREQ. COMPONENT RATIO (MTF RATIO) | EQUATION |
|---|---|
| MTFR > k | $d = \dfrac{B}{MTFR+A} + C$ |
| MTFR ≤ k | $d = D \ast MTFR + E$ |

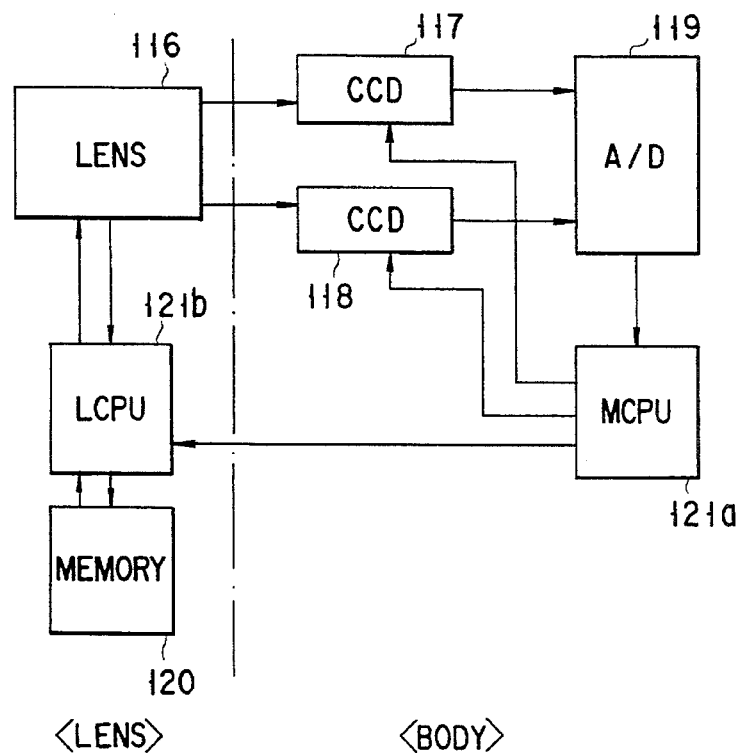
F I G. 21
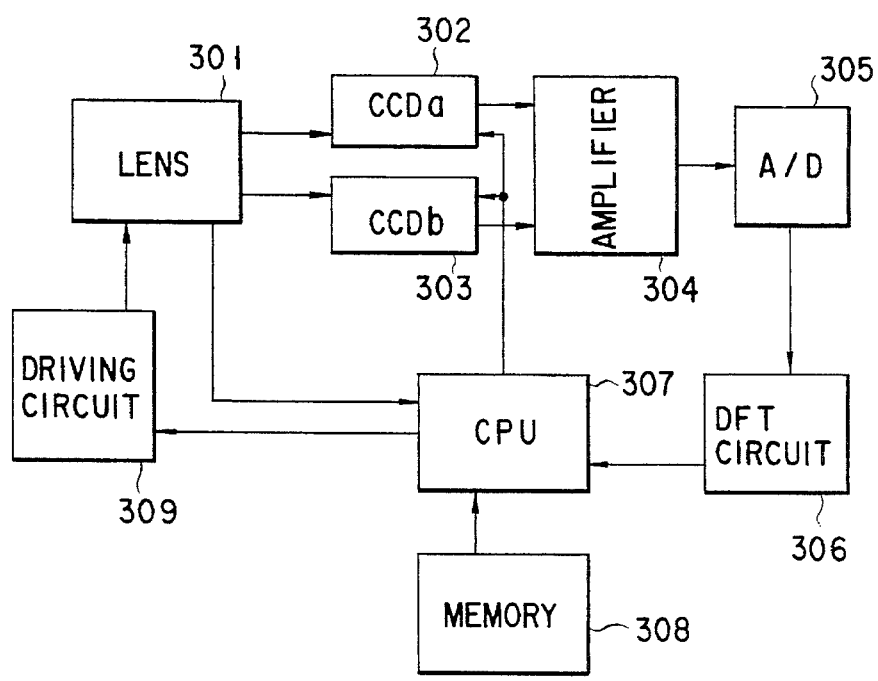
F I G. 23

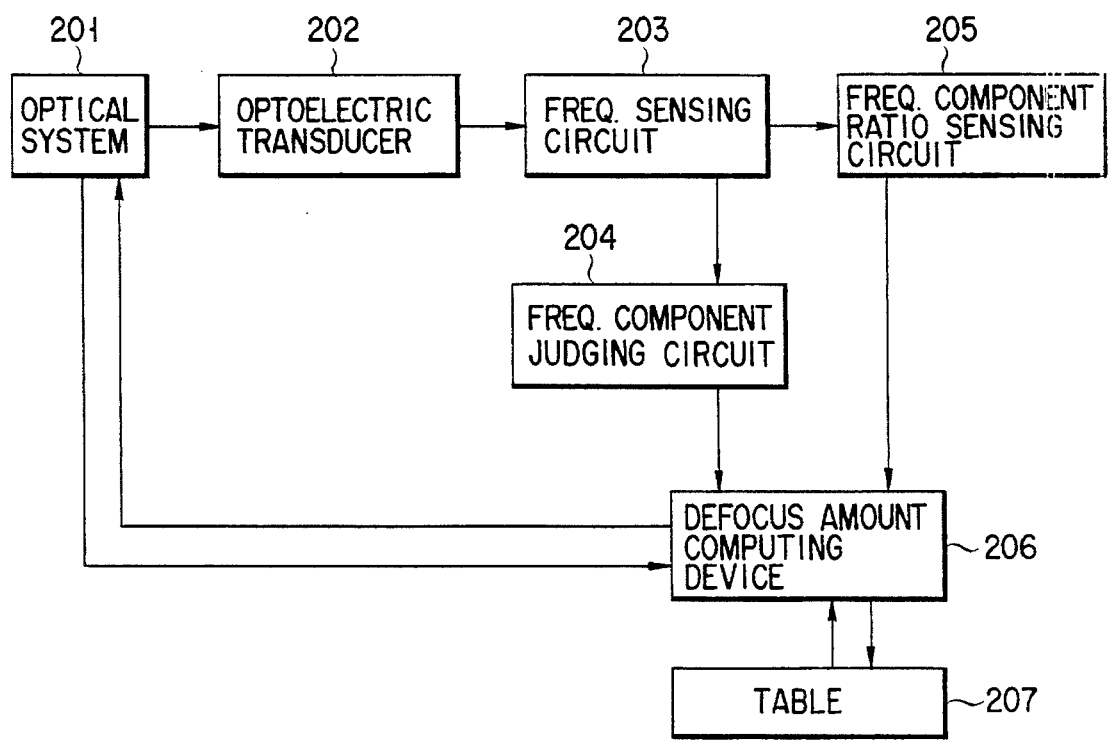
F I G. 22

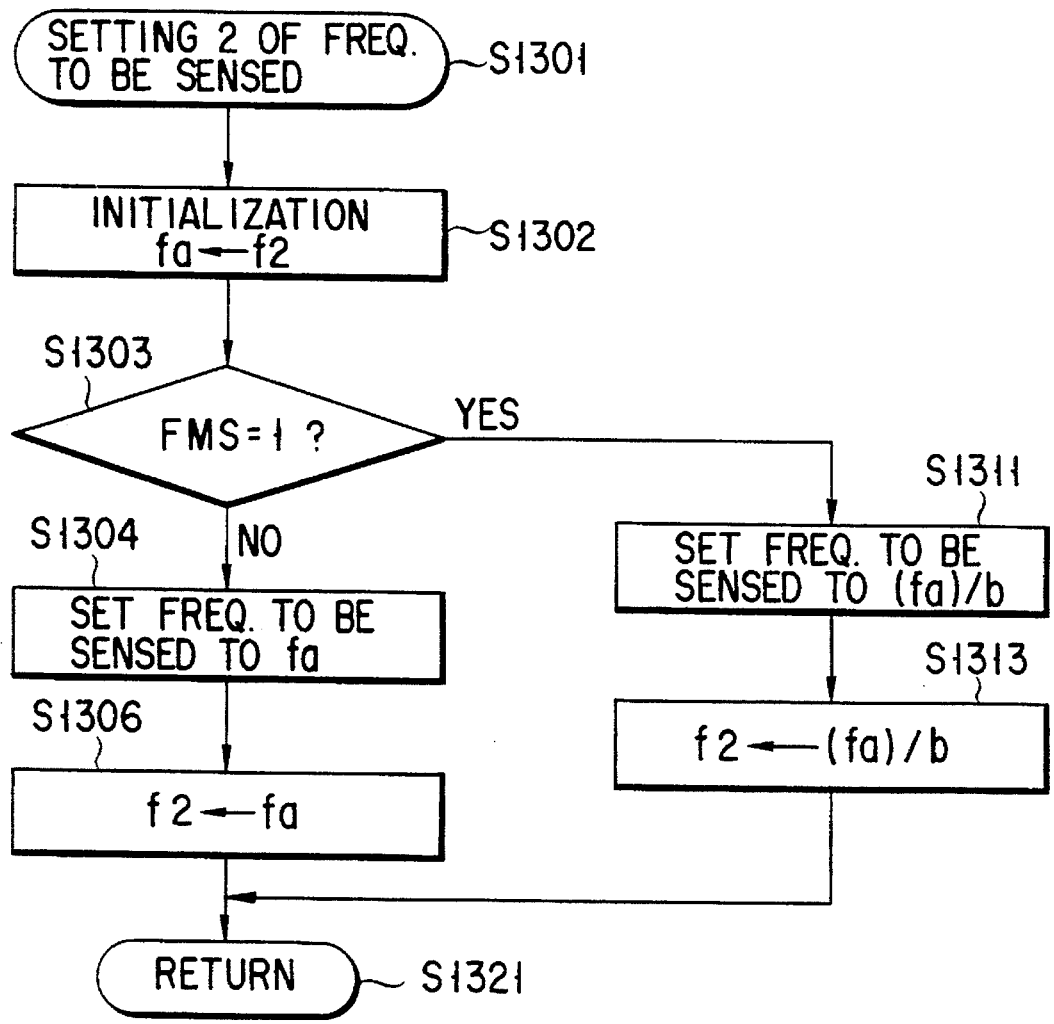
F I G. 28

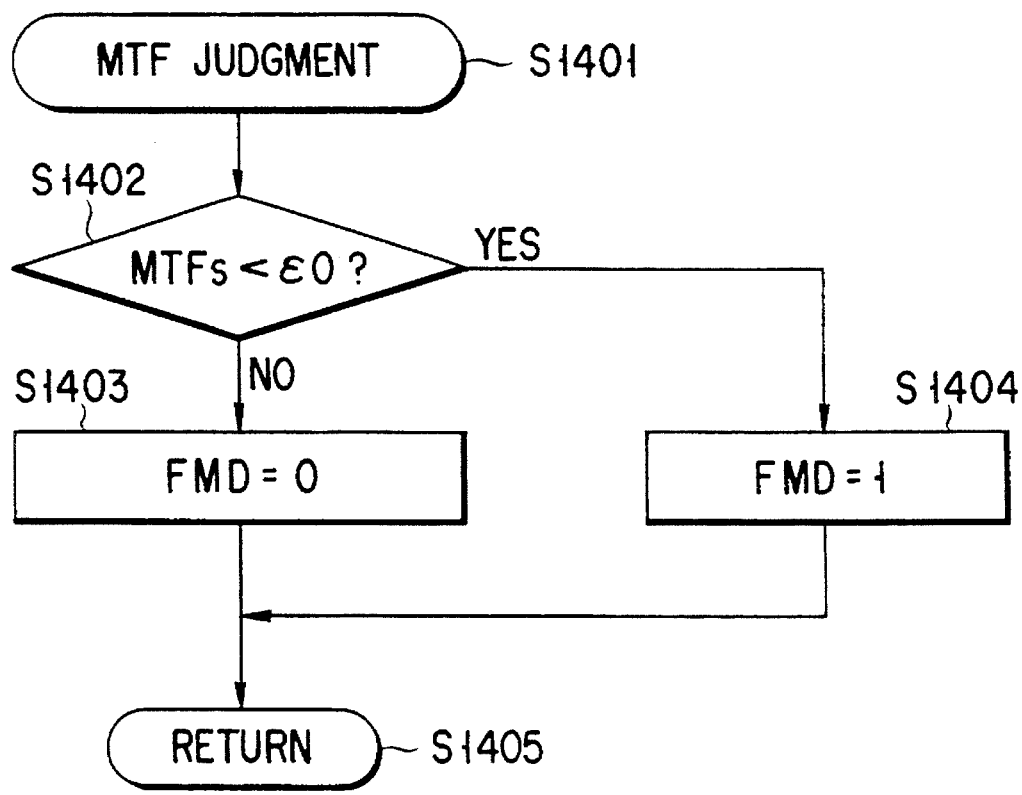
F I G. 32

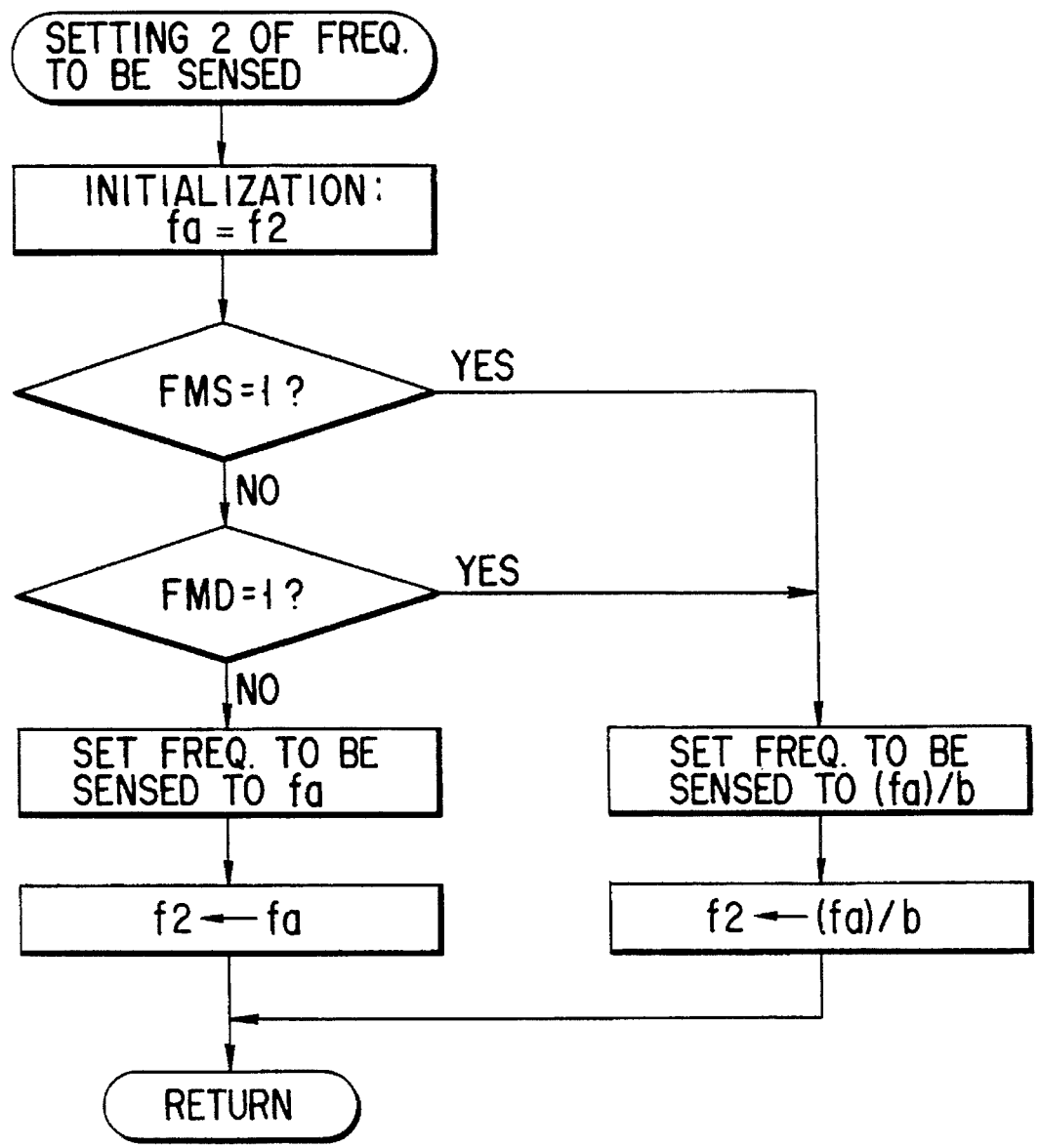
F I G. 34

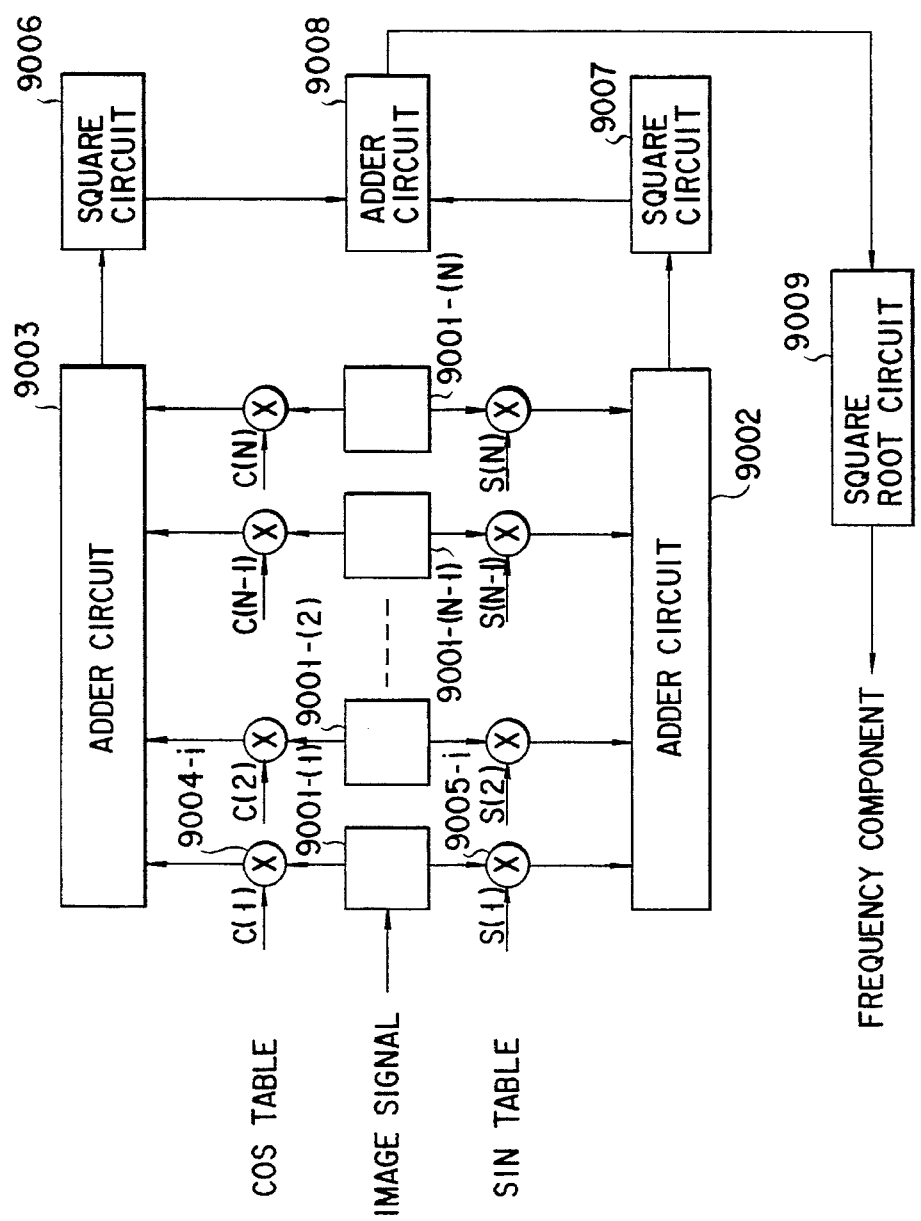
F I G. 35

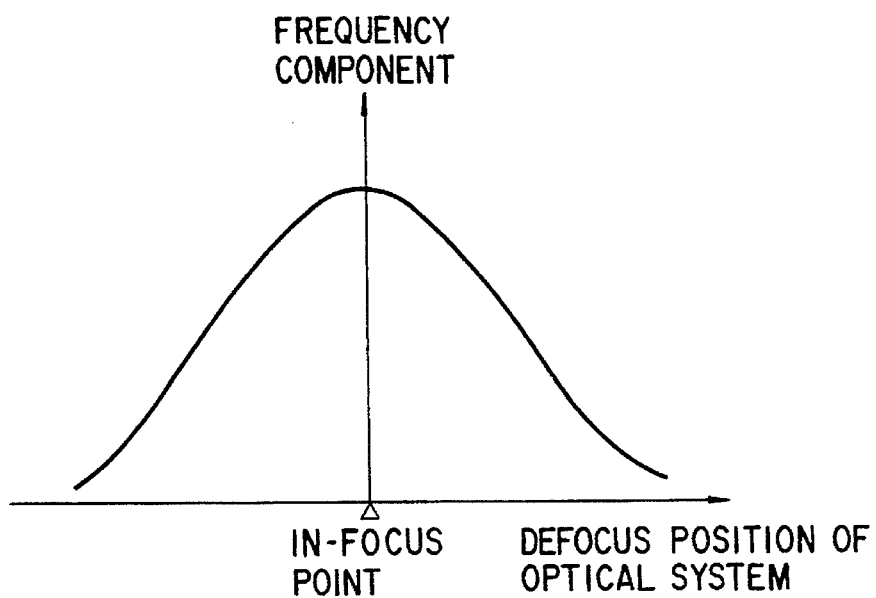
F I G. 36
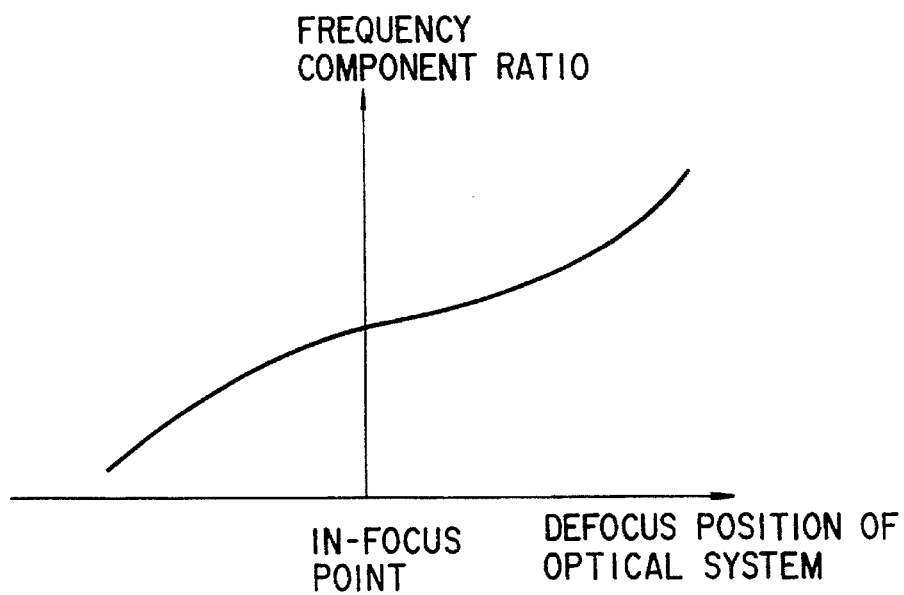
F I G. 37

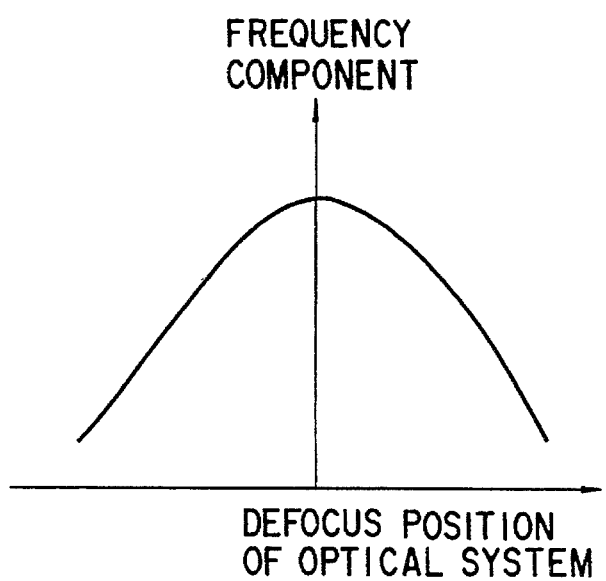
F I G. 38A
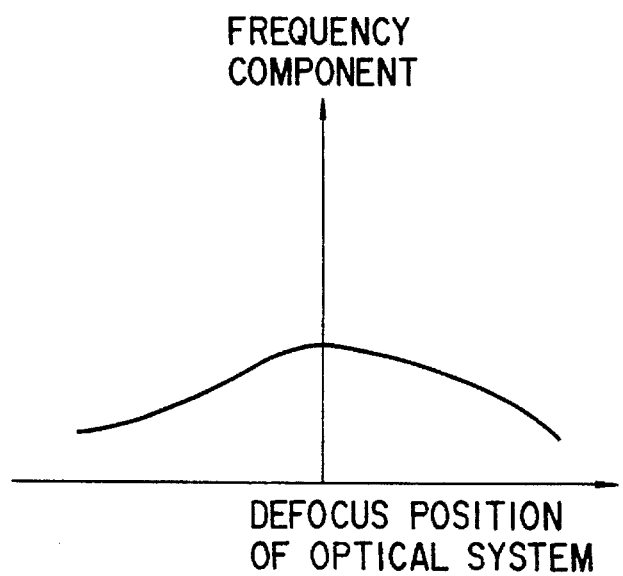
F I G. 38B

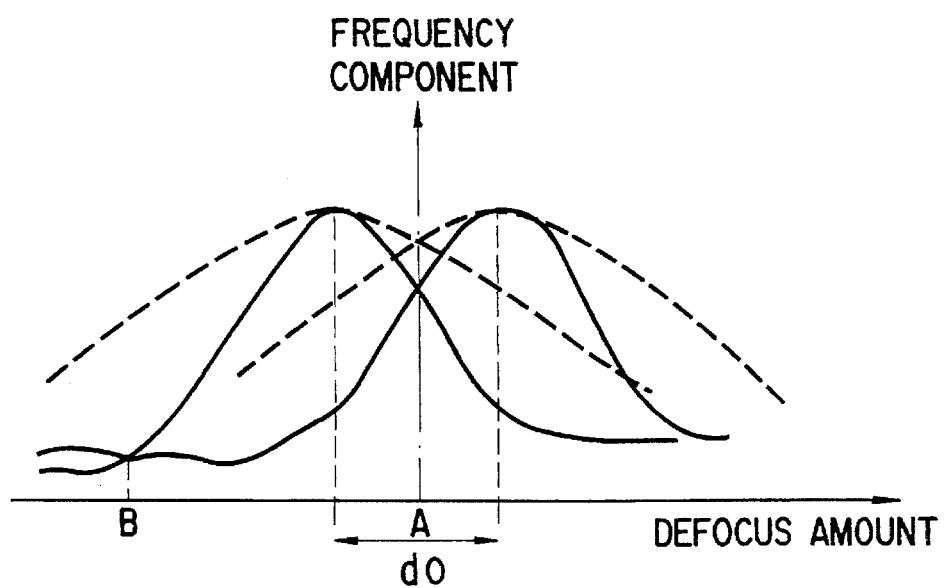
F I G. 39A
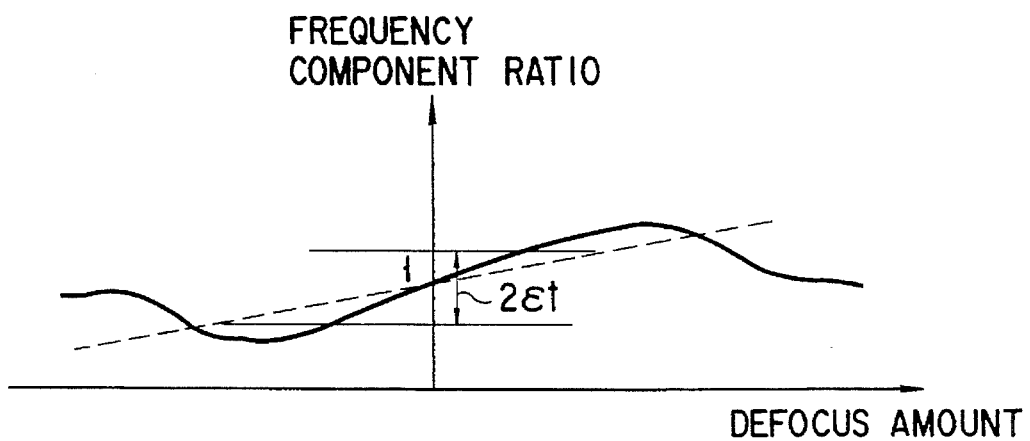
F I G. 39B

IN-FOCUS SENSING DEVICE FOR SENSING AN IN-FOCUS CONDITION USING A RATIO OF FREQUENCY COMPONENTS AT DIFFERENT POSITIONS

This application is a Continuation, of application Ser. No. 07/912,151, filed Jul. 10, 1992, now abandoned.

BACKGROUND OF THE INVENTION

1. Field of the Invention

This invention relates to an in-focus sensing device, and more particularly to an in-focus sensing device that detects an in-focus state using the image signal.

2. Description of the Related Art

A method of sensing an in-focus state using the image signal has been disclosed in Ishida, et al, "Automatic Focus Adjustment of a TV Camera by a Mountain-climbing Servo System (generally known as the mountain-climbing method)," NHK Technical Report, Vol. 17, No. 1. In FIG. 36 showing the relationship between the frequency component and the lens defocus, the high-frequency components of the image signal increase near the in-focus point as compared with the rest, or the out-of-focus region, and reach at their peak at the in-focus point (this is where the definition becomes maximum). Based on this fact, the system extracts the frequency components from the image signal, and drives the optical system toward positions with higher-frequency components. Many approaches have been proposed which use a plurality of frequencies and switch the frequency to be sensed to higher frequencies near the in-focus point, or weigh the low and high frequencies differently, as disclosed in Published Unexamined Japanese Patent Application No. 55-87114.

Another method of switching the frequency to be sensed on the basis of the information on the optical system (such as the focal length or diaphragm opening) has been proposed as in Published Unexamined Japanese Patent Application No. 60-217759.

Still another method has been disclosed in Published Unexamined Japanese Patent Application No. 2-275916 which moves the optical system to more than two positions, senses the frequency components at those positions, and obtains the ratio of those frequency components to find the in-focus point. FIG. 37 shows the frequency component ratio versus defocus characteristics for the MD curve of FIG. 36 (the curve of the frequency component versus lens defocus characteristics).

As noted above, many methods including a mountain-climbing method have been proposed for in-focus sensing based on a change in the image signal. In the mountain-climbing method, the imaging optical system is driven gradually, and the frequencies to be sensed are switched according to the difference between the frequency components. This approach creates the following problem: as shown in FIGS. 38A and 38B (FIG. 38A shows a case where there are a lot of frequency components, and FIG. 3B shows a case where there are a small amount of frequency components), when the frequency components of the subject is low in frequency, there is a possibility that the frequencies are changed as a result of erroneously determining that the vicinity of the in-focus point has been reached (or erroneously sensing high-frequency components), affecting the in-focus accuracy.

In a method of switching the frequencies to be sensed on the basis of the focal length and diaphragm opening of the optical system, the shape of a mountain to be sensed is made uniform to equalize the response characteristics of in-focus sensing. This method is a type of the mountain-climbing method, so that it has a similar problem mentioned earlier.

In a method of sensing the in-focus point based on the frequency component ratio, the frequency to be sensed is determined for the large defocus (with the object point in the closest position and the optical system in an infinite position, or with the object point in an infinite position and the optical system in the closest position), which results in a small change in the frequency component ratio near the in-focus point, thus decreasing the sensing accuracy. Therefore, it is necessary to prepare a high resolution table with a large capacity.

When the frequencies to be sensed are limited to reduce the capacity of the table, there appears a spurious in-focus point (as indicated by solid lines in FIGS. 39A and 39B), since the frequency component ratio takes the same value as that of the in-focus signal at an optical position other than the proper in-focus point.

In FIG. 39A, the solid lines represent the relationship between the defocus and the frequency component with an optical path difference of d0, with the abscissa indicating the defocus amount and the ordinate the frequency component. In FIG. 39B, the frequency component ratio near the in-focus point A has almost the same value as that near the out-of-focus point B, with the abscissa indicating the defocus amount and the ordinate the frequency component ratio (A: in-focus point; B: appears where S/N ratio is poor due to noise or optical reflection).

In a method of computing the frequency component ratio, when their absolute values are small, there is a possibility that a spurious in-focus point appears owing to computation errors.

Low-frequency components are important in sensing. To assure high accuracy requires the output signal to have a very high S/N ratio. Even when the defocus amount is small (for example, the optical system is in the middle of an infinite position and the closest position), it is necessary to sense frequencies lower than are required, and the signal needs to have a very high S/N ratio to ensure high accuracy.

There is still another method of providing two sensors with a specific optical path difference within the camera body instead of moving the imaging optical system to more than two positions, and obtaining the frequency component ratio from the outputs of those two sensors. This method requires that the relationship between the frequency component ratio and defocus amount as shown in FIG. 37 should be stored in table form for each imaging optical system. Since such a relationship is determined by the optical path difference between the two sensors, when the optical system is installed to another camera body, it is impossible to detectthe in-focus point correctly unless the optical path difference between the two sensors in each camera body is identical design.

Practically, since such an optical path difference should be determined so as to meet the AF function of each camera (with priority given to accuracy or speed), it is not desirable to apply the same value to all cameras. If a plurality of tables of frequency component ratio versus defocus amount for individual optical path differences are stored in the memory of the imaging optical system, there arises a problem of the memory capacity becoming larger.

Generally, in this method, the in-focus point is roughly sensed based on the low-frequency components of the image signal, and then, is accurately determined based on the high frequency components. This frequency switching method, however, needs to memorize at least two types of frequency ratio versus defocus amount tables: a high frequency table and a low frequency table.

SUMMARY OF THE INVENTION

A first object of the present invention is to provide a highly accurate in-focus sensing device with a suitable S/N ratio using a smaller number of tables, and having no effect on the in-focus accuracy even when switching the frequencies to be sensed according to the position of the optical system and the frequency component ratio.

A second object of the present invention is to provide a highly systematic in-focus sensing device with a small capacity without storing a table for the optical path difference between the two sensors in the camera body of each type or two types of tables of frequency ratio versus defocus amount for frequency switching.

A third object of the present invention is to provide a fast, high-accuracy in-focus sensing device with a smaller number of tables that verifies the reliability of the sensed frequency component ratio based on a rough frequency component ratio or the magnitude of the frequency components, and then changes the frequencies to be sensed.

The first object is accomplished by providing an in-focus sensing device for a camera comprising: an optical system for directing the luminous flux from the subject; optoelectric transducer means for converting the optical distribution of the luminous fluxes with different optical path lengths passing through the optical system, into an electrical distribution; frequency extracting means for extracting a specific frequency component from each output of the optoelectric transducer means; frequency component ratio sensing means for obtaining the ratio of two frequency components with different optical path lengths based on the output of the frequency extracting means; defocus amount computing means for obtaining the defocus amount for the optical system based on the frequency component ratio from the frequency component ratio sensing means; driving means for driving the optical system based on the defocus amount from the defocus amount computing means; and frequency switching means for setting a first frequency as the specific frequency at the frequency extracting means, and based on the frequency ratio for the first frequency, setting a second frequency as the specific frequency.

The second object is accomplished by providing an in-focus sensing device for a camera comprising: an inter changeable lens; memory means provided in the interchangeable lens, for storing the coefficients used in computing the defocus amount from the frequency component ratio, according to the imaging lens characteristics; sensor means for converting the subject image passing through the inter changeable lens into optoelectric conversion analog signals, at two adjacent points conjugated with the focal surface; A–D converting means for converting the optoelectric conversion analog signals from the sensor means into digital signals; control means for obtaining the ratio of the frequency components corresponding to the two points based on the digital signals from the A–D converting means, and computing the defocus amount based on the coefficients in the memory means; and driving means for driving the interchangeable lens based on the defocus amount computed at the control means.

The third object is accomplished by providing an in-focus sensing means for a camera comprising: an imaging lens; frequency component sensing means for optoelectrically converting the subject image passing through the imaging lens in two places, and obtaining the ratio of first specific frequency components; judging means for obtaining the defocus amount by a specific equation based on the first specific frequency component ratio from the frequency component ratio sensing means, and judging whether or not the vicinity of the in-focus point has been reached; reliability judging means for obtaining the ratio of second specific frequency components higher than the first specific frequency components when the previous judging means judges that the vicinity of the in-focus point has been reached, and judging the reliability of whether the vicinity of the in-focus point has been reached; switching means for changing the second specific frequency to a lower frequency when the reliability judging means judges that the reliability of the in-focus point having been reached is unacceptable, and based on this new second specific frequency, sensing the frequency components; and drive control means for computing the driving amount based on the frequency component ratio when the reliability judging means judges that the reliability is acceptable, and driving the imaging lens based on the defocus amount.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram of a first embodiment of the present invention;

FIG. 2A shows the frequency components versus defocus characteristics for low frequencies, FIG. 2B the frequency component ratio versus defocus characteristics with a specific optical path difference, FIG. 2C the frequency component versus defocus characteristics for high frequencies, and FIG. 2D the frequency component ratio versus defocus characteristics with a specific optical path difference;

FIG. 6 shows the sequence of the subroutine program AF of FIG. 5;

FIG. 7 shows the frequency component versus defocus characteristics at specific frequencies of the lens;

FIG. 8 is an explanatory diagram for setting comparison values ∈1 and ∈2 for MTFR;

FIG. 13 is a block diagram of a camera to which an in-focus sensing device according to a fourth embodiment of the present invention is applied;

FIG. 21 is a block diagram of a camera to which an in-focus sensing device according to a sixth embodiment of the present invention is applied;

FIG. 22 is a block diagram of a seventh embodiment of the present invention;

FIG. 23 is a block diagram of an eighth embodiment of the present invention;

FIG. 28 is a flowchart for setting 2 of the frequency to be sensed;

FIG. 32 is a flowchart of judging MTF in FIG. 30;

FIG. 34 is a flowchart for setting 2 of the frequency to be sensed in FIG. 30;

FIG. 35 is a detailed diagram of the DFT circuit of FIG. 4;

FIG. 36 shows the relationship between the frequency component and lens defocus;

FIG. 37 shows the relationship between the frequency component ratio and defocus for the MD curve shown in FIG. 36 (the curve of the frequency component versus lens defocus characteristics);

FIG. 38A shows the relationship between the frequency component and lens defocus when there are a lot of frequency components, and FIG. 38B shows the relationship between the frequency component and lens defocus when there are a small number of frequency components; and FIGS. 39A and 39B show the relationship between the defocus amount and frequency component and the relationship between the defocus amount and frequency component ratio, respectively.

DETAILED DESCRIPTION OF THE PREFERRED EMBODIMENTS

Figure 3:
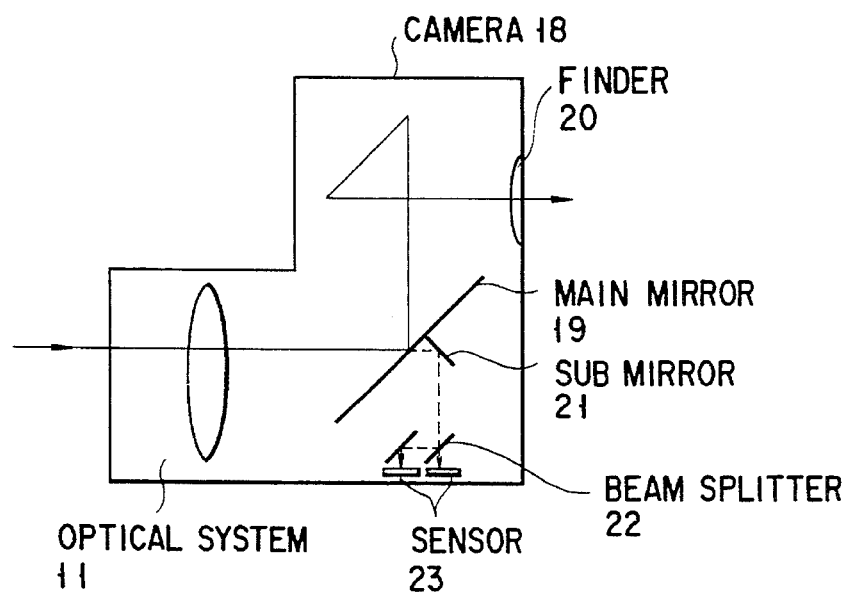
FIG. 3 is a schematic view showing the construction of a camera to which an in-focus sensing device according to a second embodiment of the present invention is applied.

Referring to the accompanying drawings, embodiments of the present invention will be explained.

A schematic block diagram of an in-focus sensing device according to a first embodiment of the present invention is shown in FIG. 1.

The in-focus sensing device is composed of an optical system 11 for directing the luminous flux from the subject, an optoelectric transducer 12 for converting the distribution of the light from the subject passing through the optical system 11 into the electrical distribution, a frequency extracting section 13, a frequency component ratio sensing section 14, and a switching section 15 for changing the frequency component the frequency extracting section 13 is to extract, based on the output of the frequency component ratio sensing section 14. It is also provided with a defocus amount sensing section 16 and a driving section 17 for driving the optical system 11.

The switching section 15 has the function of switching the frequency to be sensed according to the present position of the optical system 11.

With this arrangement, the luminous flux from the optical system 11 is optoelectrically converted at the optoelectric transducer 12. The frequency extracting section 13 extracts one from the frequency components of the luminous flux, which is then stored. The frequency component ratio sensing section 14 calculates the ratio of frequency components with different optical path lengths, from the extracting section 13.

The switching section 15, based on the output of the frequency component ratio sensing section 14, changes the frequency components that the frequency extracting section 13 is to extract. The defocus amount sensing section 16, based on the frequency component ratio, computes the defocus amount for the optical system 11. According to the defocus amount, the driving section 17 then drives the optical system 11.

Referring to FIGS. 2A to 2D, the frequency component versus defocus characteristics and the frequency component ratio versus defocus characteristics with a specific optical path length will be described, taking into account noise.

FIG. 2A shows the frequency component versus defocus characteristics for low frequencies; FIG. 2B the frequency component ratio versus defocus characteristics with a specific optical path difference; FIG. 2C the frequency component versus defocus characteristics for high frequencies; and FIG. 2D the frequency component ratio versus defocus characteristics with a specific optical path difference. FIGS. 2B and 2D also include cases where there are noises.

In the case of low frequencies, for frequency component ratios of A and B, errors δA and δB appear in the actual defocus amounts AA and BB. Because point AA is near the in-focus point, a curve of the frequency component ratio versus defocus characteristics is almost flat at low frequencies, leading to larger errors due to noise. However, switching the frequency to be sensed to a higher frequency (FIG. 2D) makes the curve of frequency component ratio versus defocus sharper at point AA, thereby decreasing error dC remarkably.

A method of sensing the in-focus point based on the frequency component ratio has been disclosed in detail in Published Unexamined Japanese Patent Application No. 2-275916. The rough equations for this method will be listed below.

The ratio of specific frequency components of two images with a specific optical path difference is determined by the relationship between the subject position in the optical system and the position of the optical system, independent of the frequency components of the subject.

$S1(\omega) = O(\omega) * L1(\omega)$ $S2(\omega)=O(\omega)*L2(\omega)$ $S1(\omega)/S2(\omega)=L1(\omega)/L2(\omega)$ where * is a multiplication sign, $O(\omega)$ the frequency component of the subject, $L1(\omega)$, $L2(\omega)$ the transfer characteristics of the optical system, and $S1(\omega)$, $S2(\omega)$ the sensed frequency components.

FIG. 3 is a schematic view of a camera to which an in-focus sensing device according to a second embodiment of the present invention is applied. The luminous flux passing through the optical system 11 in the camera 18 is divided by a main mirror (M mirror) 19 into two portions: one entering the finder system and the other entering the AF sensing system, the M mirror being made up of a half mirror at its central portion only. The luminous flux introduced into the finder system is directed to the finder 20, whereas the one introduced into the AF sensing system is directed by a submirror (S mirror) 21 to a beam splitter 22, and then is converted into an electric signal at a sensor 23.

Figure 4:
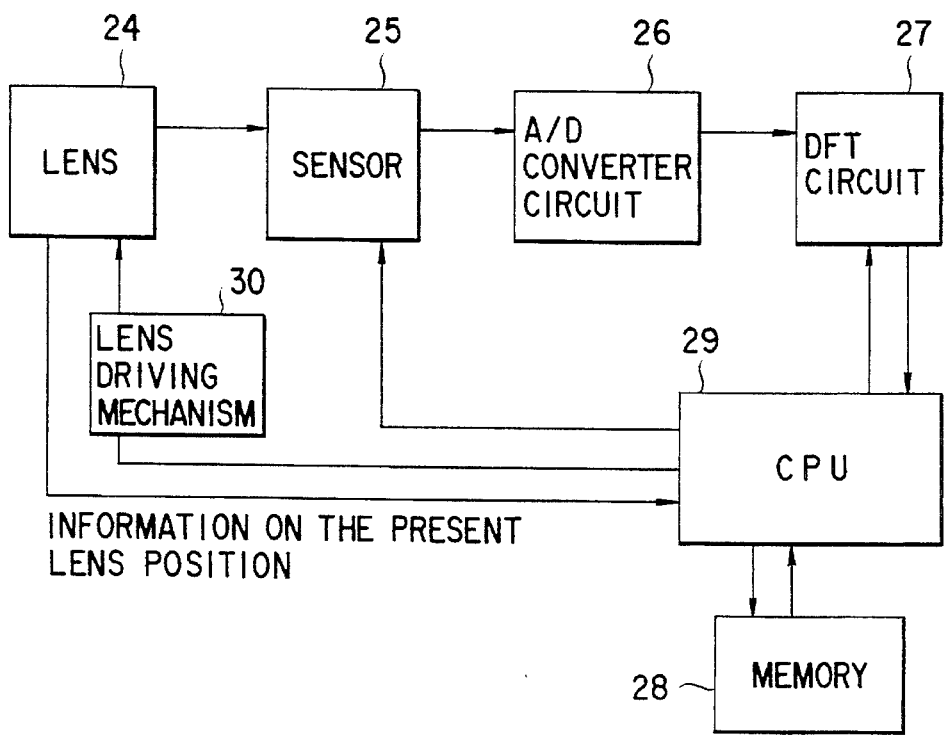
FIG. 4 is a block diagram of the camera of FIG. 3.

FIG. 4 is a block diagram of the camera of FIG. 3.

The camera is composed of a lens 24, a sensor 25 for converting the luminous flux passing through the lens 24 into an electric signal, an A/D converter circuit 26 for converting the signal from the sensor 25 into a digital signal, and a DFT (Discrete Fourier Transform) circuit 27 for extracting a specific frequency component from the digital signal from the sensor 25. It is also composed of a CPU 29, which controls the sensor 25 based on the present position of the lens 24, and senses the ratio of two frequency components with different optical path lengths to compute the driving amount of the lens 24, a memory 28 for storing the frequency component ratio for the lens 24 for more than one frequency and communicating with the CPU, and a lens driving mechanism 30 for driving the lens 24 according to the drive control signal from the CPU 29.

A detailed construction of the DFT circuit 27 of FIG. 4 is shown in FIG. 35. The DFT circuit 27 is made up of areas 9001-(1) to 9001-(N) for storing image signals, multipliers 9004-(i) and 9005-(i) for multiplying each image signal by the value $C(i), S(i)$: i=1 to N) in the COS and SIN function tables specified by the CPU, an adder circuit 9003 for adding the image signal to the multiplication result for the COS function table, an adder circuit 9002 for adding the image signal to the multiplication result for the SIN function table, square circuits 9006 and 9007 for squaring each of the outputs of the adders 7003 and 9004, an adder 9008 for adding the outputs of the square circuits 9006 and 9007, and a square root circuit 9009 for determining the square root of the output of the adder 9008.

The square root circuit may be omitted providing that the frequency component ratios and defocus amounts listed in the table are modified suitably.

The multiplier circuits C(1) to C(N) may also serve as the multiplier circuits S(1) to S(N).

Those functions may be realized by programming in the CPU.

The operation of the DFT circuit 27 thus constructed will be explained.

The A–D converted image signals are stored in areas 9000-(1) to 9000-(N). The CPU 29 reads the values from the COS and SIN function tables stored in the memory 28, and supplies them to the multiplier circuits C(1) to C(N) and S(1) to S(N). The multiplier circuit C(1) multiplies the contents of the memory 9000-(1) by the value read from the COS function table, and supplies the result to the adder circuit 9003. The adder circuit 9003 adds the outputs of the multiplier circuits S(1) to S(N), and supplies the result to the square circuit 9006. The multiplier circuits S(1) to S(N) perform similar calculations, and the multiplication results are added together at the adder circuit 9002, which then supplies the result to the square circuit 9007, which in turn squares the input. The outputs of the square circuits 9006 and 9007 are added together at the adder circuit 9008, which supplies the result to the square root circuit, which in turn computes the square root of the input, and supplies the result as the frequency component signal to the CPU 29.

The operation of the camera thus constructed will be explained, referring to the FIG. 5 flowchart as the main sequence.

When the operation is started, initialization is carried out at step S1, and then at step S2, it is judged whether or not the first release has been turned on. When the first release is off, the sequence is terminated, where as when it is on, flow proceeds to step S3 at which it is judged whether or not the second release has been turned on.

At step S3, when the second release is on, flow proceeds to step S4, at which the shutter and wind sequences are executed and then flow returns to step S1. On the other hand, when it is off, the flow proceeds to step S5, at which the subroutine program AF is performed.

Then, at step S6, the in-focus flag is judged: flag GF=1 when the lens is in the in-focus position, and GF=0 when the lens 24 has to be driven in an out-of-focus position. At step S6, when GF=1, flow returns to step S1, whereas when GF=0, flow proceeds to step S7, at which the lens 24 is driven to the position specified by the subroutine program AF.

Figure 5:
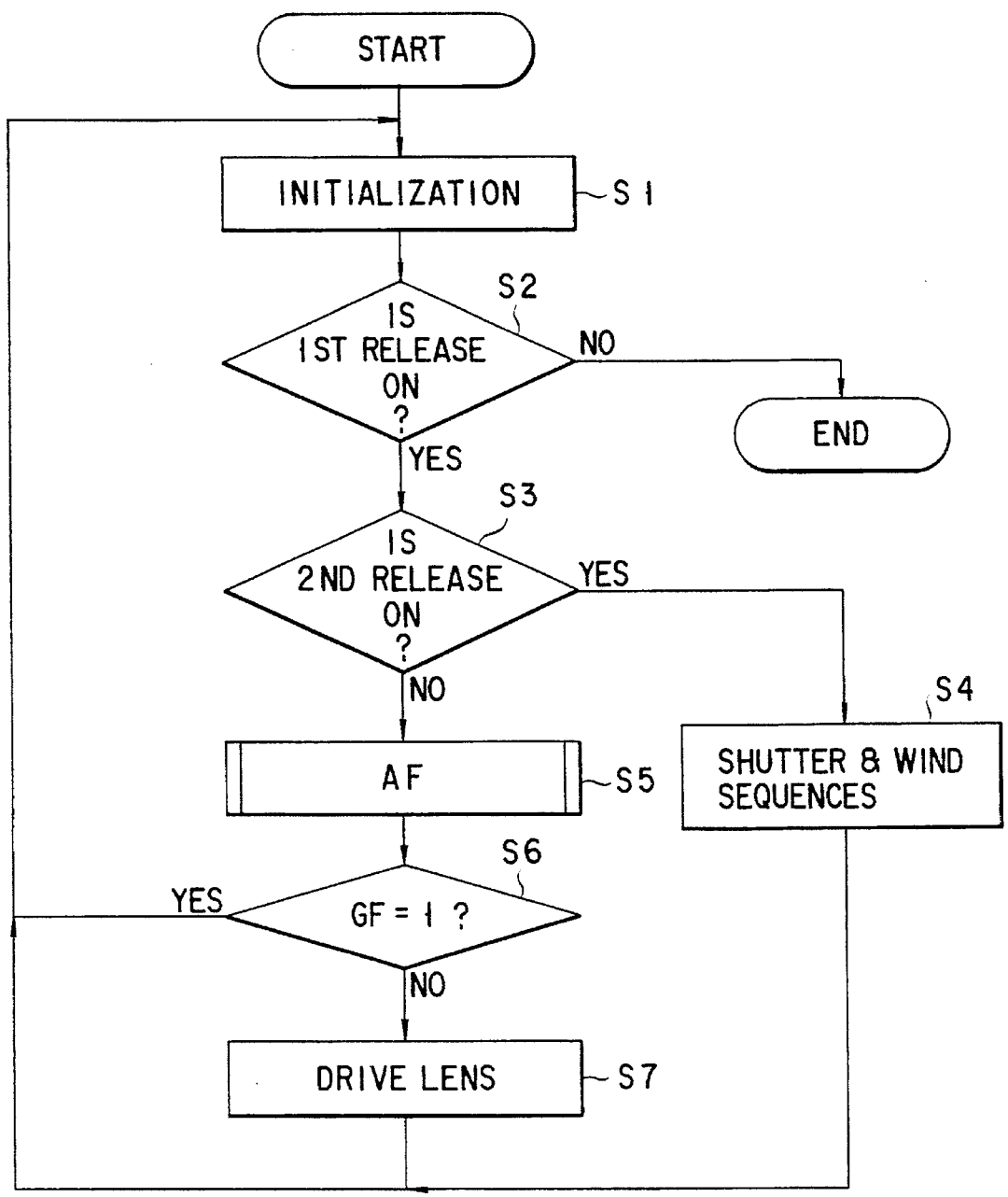
FIG. 5 is a flowchart for explaining the operation of the second embodiment.

FIG. 6 shows the sequence of the subroutine program AF of FIG. 5.

When the subroutine program AF is started, it is first initialized (step A1), and the output of the sensor 25 is integrated (step A2). After integration, the sensor signal is read out and A–D converted into digital data for storage (step A3). Next, the frequency to be sensed is set to f1 (step A4), and the frequency f1 is sensed by digital processing (DFT: Discrete Fourier Transform) (step A5).

Then, the ratio (MTFR) of the frequency components from the two sensors with a specific optical path difference is detected (step A6), and the MTFR is compared with a specific value $\epsilon 1$ (step A7). When $|MTFR-1|<\epsilon 1$ is false, the table in which the MTFR and the defocus amount at the frequency f1 of the lens 24 are stored is referred to, and the defocus amount is interpolated to compute the driving amount L1 of the lens 24 (step A8).

On the other hand, at step A7, when $|MTFR-1|<\epsilon 1$ is true, this means that the lens 24 is already in the vicinity of the in-focus point. Therefore, to raise the in-focus sensing accuracy, the frequency to be sensed is changed from f1 to a higher frequency f2 (f2 is such a frequency that the interval between the two sensors is less than Z0 in the lens frequency component versus defocus characteristics of FIG. 7) (step A9). Next, the frequency f2 is sensed by digital processing (DFT) (step A10), and the ratio (MTFR) of the frequency components from the two sensors with a specific optical path difference is sensed (step A11).

After this, the MTFR is compared with a specific value $\epsilon 2$ (step A12). At step A12, when $|MTFR-1|<\epsilon 2$ is false, the table in which the MTFR and the defocus amount at the frequency f2 of the lens 24 are stored is referred to, and the defocus amount is interpolated to compute the driving amount L2 of the lens 24 (step A13). After the driving amount of the lens 24 has been computed at step A13, the in-focus flag GF is set to GF=0 (step A14).

On the other hand, at step A12, when |MTFR−1|< ∈2 is true, the in-focus flag GF is set to GF=1 (step A15), and then the subroutine program AF is terminated.

FIG. 7 shows the frequency component versus defocus characteristics for specific frequencies of the lens used in this embodiment.

In the figure, the ordinate indicates the frequency components of the lens (rated as 1 when an ideal subject is in focus), and the abscissa represents the defocus amount of the lens. The lens frequency component M0 is set, taking into account noise (the minimum S/N ratio is assured at M0, considering the fact that the S/N ratio decreases as the amount of signal components gets smaller). The defocus amount from the in-focus point at that time is assumed to be Z0. That is, once the defocus range is determined, in-focus sensing is done using such a frequency that prevents the lens frequency components from dropping below M0 in the range. When the in-focus sensing defocus range is Z0, the frequency to be sensed f1 is set to f10.

FIG. 8 is an explanatory diagram for setting comparison values ∈1 and ∈2.

In the figure, ∈1 is a switching point at which the frequencies to be sensed f1 and f2 are changed, and is determined, considering two optical path differences and S/N ratio of signals. ∈2 is determined, taking into account the in-focus accuracy (determined by the lens F number $F_{NO}$) and S/N ratio.

Figure 9:
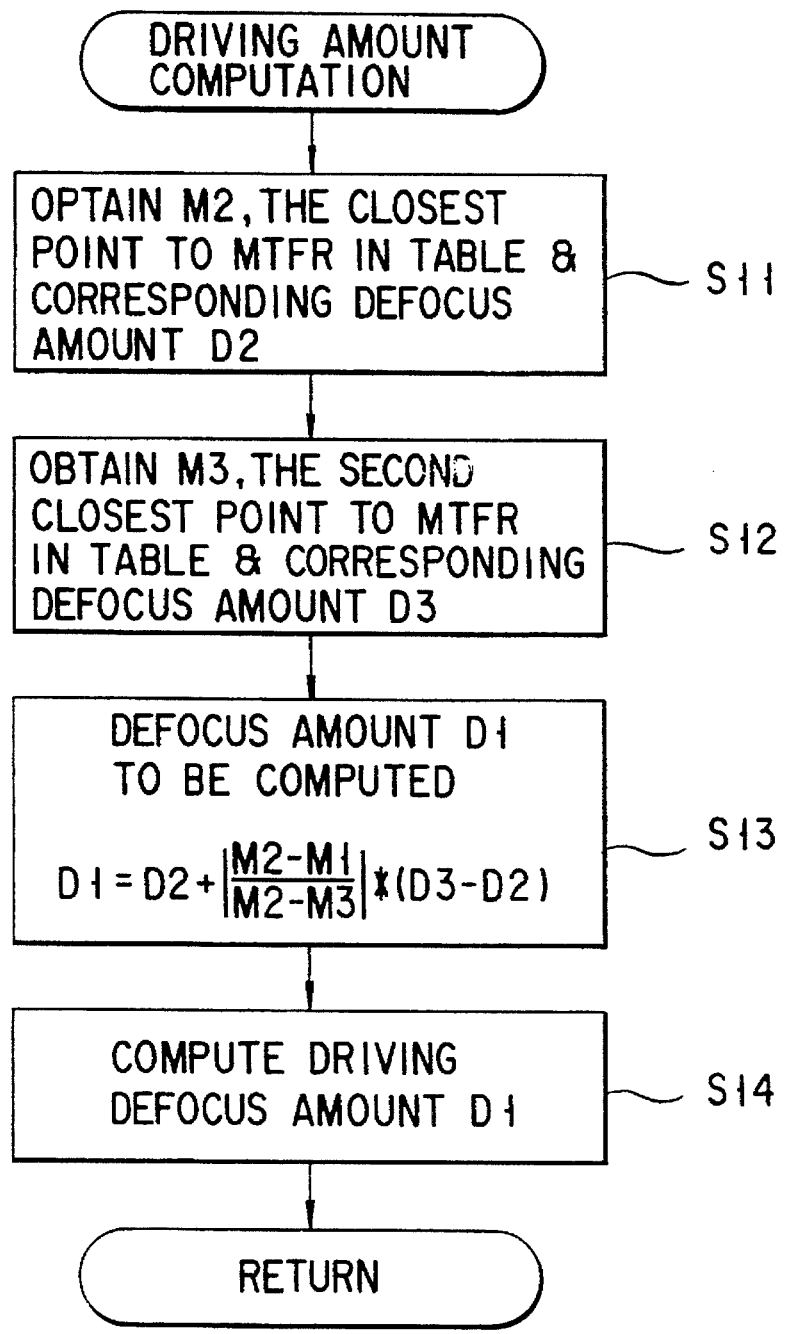
FIG. 9 is a flowchart for explaining the operation of computing the driving amount.

Referring to the flowchart of FIG. 9, how to compute the driving amount of the lens 24 will be explained.

The driving amount is computed using the table showing the relationship between an MTFR corresponding to the frequency to be sensed and the defocus amount (the defocus points have been sampled discretely). It is assumed that the sensed MTFR is M1, the defocus amount to be obtained is D1, an MTFR value closest to M1 in the reference table is M2, the defocus amount corresponding to M2 is D2, an MTFR value next closest to M1 is M3, and the defocus amount corresponding to M3 is D3.

When the calculation of the driving amount is started, M2 is first obtained from the reference table (step S11). Then, M3 is obtained from the reference table (step S12). After this, the defocus amount D1 for M1 is computed (step S13).

$$D1=D2+|(M2-M1)/(M2-M3)|*(D3-D2)$$

Next, the driving amount is calculated from the sensed defocus amount and the present lens position (step S14). Then, this sequence is terminated.

With this arrangement, it is possible to provide a fast, simple in-focus sensing device independent of the state of the subject.

While in this embodiment, DFT processing is done in frequency sensing, other forms of processing such as digital filters or analog filters may be used as long as they can sense a narrow frequency band.

In the above embodiment, the switching of the frequencies to be sensed is done twice. The sensing of frequency components may be done by parallel processing and the frequencies to be sensed be changed several times.

The number of frequencies to be sensed may be more than one in the range fulfilling the conditions of FIG. 7.

A third embodiment of the present invention will be explained.

With the same arrangement as that of the second embodiment, the switching of the frequencies to be sensed will be explained.

Figure 10:
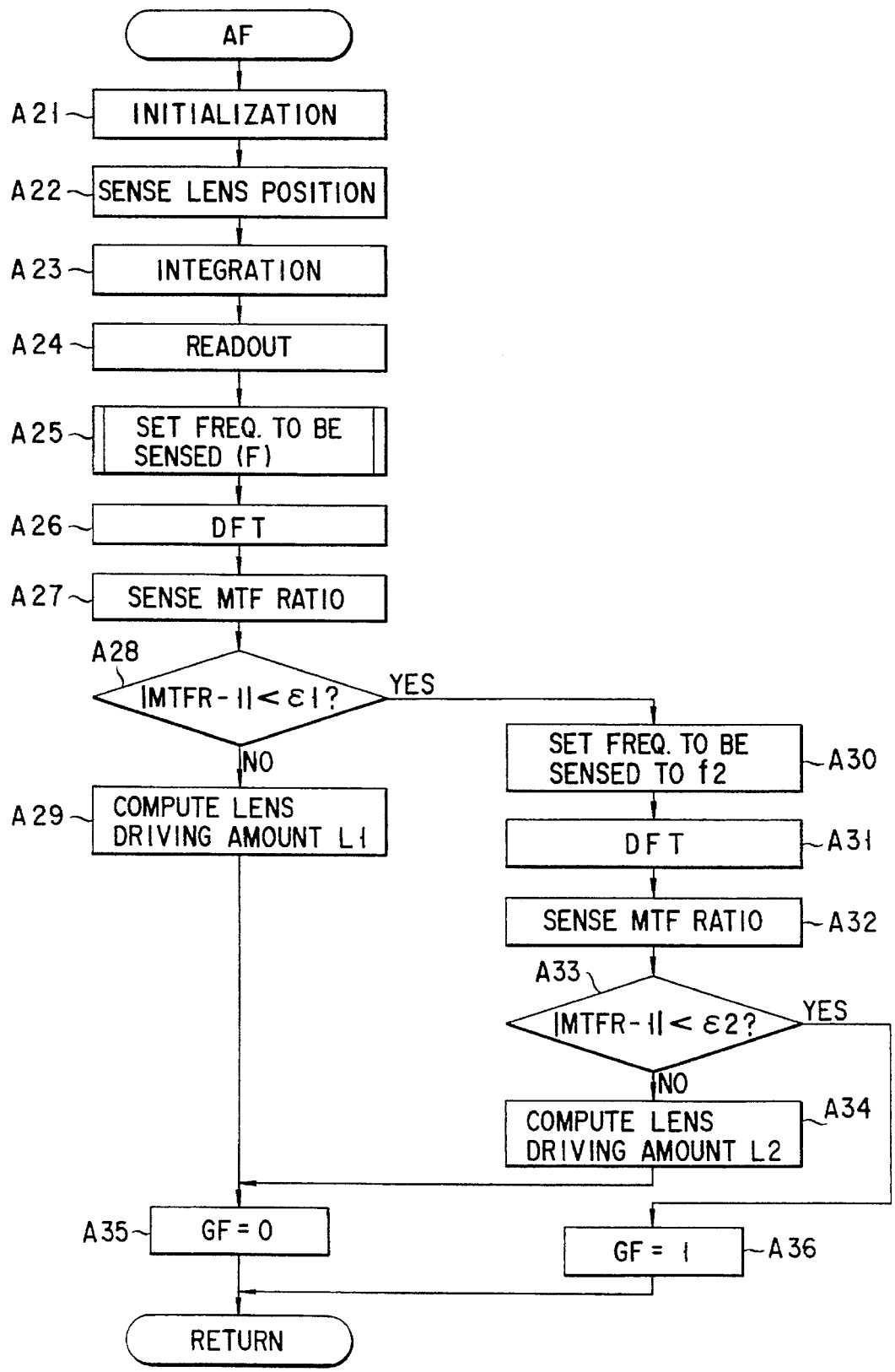
FIG. 10 shows the sequence of the subroutine program AF in the third embodiment.

FIG. 10 shows the sequence of the subroutine program AF.

When the subroutine program AF is started, it is first initialized (step A21), and the present position of the lens 24 is sensed (step A22). Then, the output of the sensor 25 is integrated (step A23). After integration, the sensor signal is read out and A–D converted into digital data for storage (step A24).

Then, the frequency to be sensed F is set (step A25). After the sensor data has undergone a window operation (in which the signal levels of both ends of the sensor data are adjusted so as to have no effect on the sensed frequency), the frequency F is sensed by digital processing (DFT) (step A26).

Then, the ratio (MTFR) of the frequency components from the two sensors with a specific optical path difference is detected (step A27), and the MTFR is compared with a specific value ∈1 (step A28). When |MTFR− 1|<∈1 is false, the table in which the MTFR and the defocus amount at the frequency F of the lens 24 are stored is referred to, and the defocus amount is interpolated to compute the driving amount L1 of the lens 24 (step A29).

On the other hand, at step A28, when |MTFR−1|< ∈1 is true, this means that the lens 24 is already in the vicinity of the in-focus point. Therefore, to raise the in-focus sensing accuracy, the frequency to be sensed is changed from F to a higher frequency f2 (step A30). Next, the frequency f2 is sensed by digital processing (DFT) (step A31), and the ratio (MTFR) of the frequency components from the two sensors with a specific optical path difference is sensed (step A32).

After this, the MTFR is compared with the specific value ∈2 (step A33). At step A33, when | MTFR−1|<∈2 is false, the table in which the MTFR and the defocus amount at the frequency f2 of the lens 24 are stored is referred to, and the defocus amount is interpolated to compute the driving amount L2 of the lens 24 (step A34). After the driving amount has been computed at step A34, the in-focus flag GF is set to GF=0 (step A35).

On the other hand, at step A33, when |MTFR−1|< ∈2 is true, the in-focus flag GF is set to GF=1 (step A36), and then the subroutine program AF is terminated.

FIG. 7 shows the frequency component versus defocus characteristics for specific frequencies of the lens used in this embodiment.

Like the second embodiment mentioned earlier, the lens frequency component M0 is set, taking into account noise, the defocus amount from the in-focus point at that time is assumed to be Z0. That is, once the defocus range is determined, in-focus sensing is done using such a frequency that prevents the lens frequency components from dropping below M0 in the range.

The defocus range is determined by the position of the object point (subject) and the position of the lens 24. When the defocus range is from Z0 to Z1 (from where the lens 24 is in an infinite position or in the closest position to where the defocus is Z1 on its larger amount side), the frequency to be sensed F is set to f10. When the defocus range is from Z1 to Z2 (from where the defocus amount is Z1 on its larger amount side to where the lens 24 has almost the same defocus amount of Z2 on both the infinite side and the closest side), the frequency F is set to a higher frequency f11 than f10. When the defocus amount is near Z2 (in the range where the lens 24 has almost the same defocus amount of Z2 on both the infinite side and the closest side), the frequency F is set to a higher frequency f12 than f11 for in-focus sensing.

In the third embodiment, the switching of frequencies id done according to the lens position. For the overall feed lens, the defocus amount has a one-to-one correspondence with the lens feed. Because of this, the frequency to be sensed is selected according to the necessary feed at that time provided that the object point is at the farther of the closest and infinite ends with respect to the present lens position.

Figure 11:
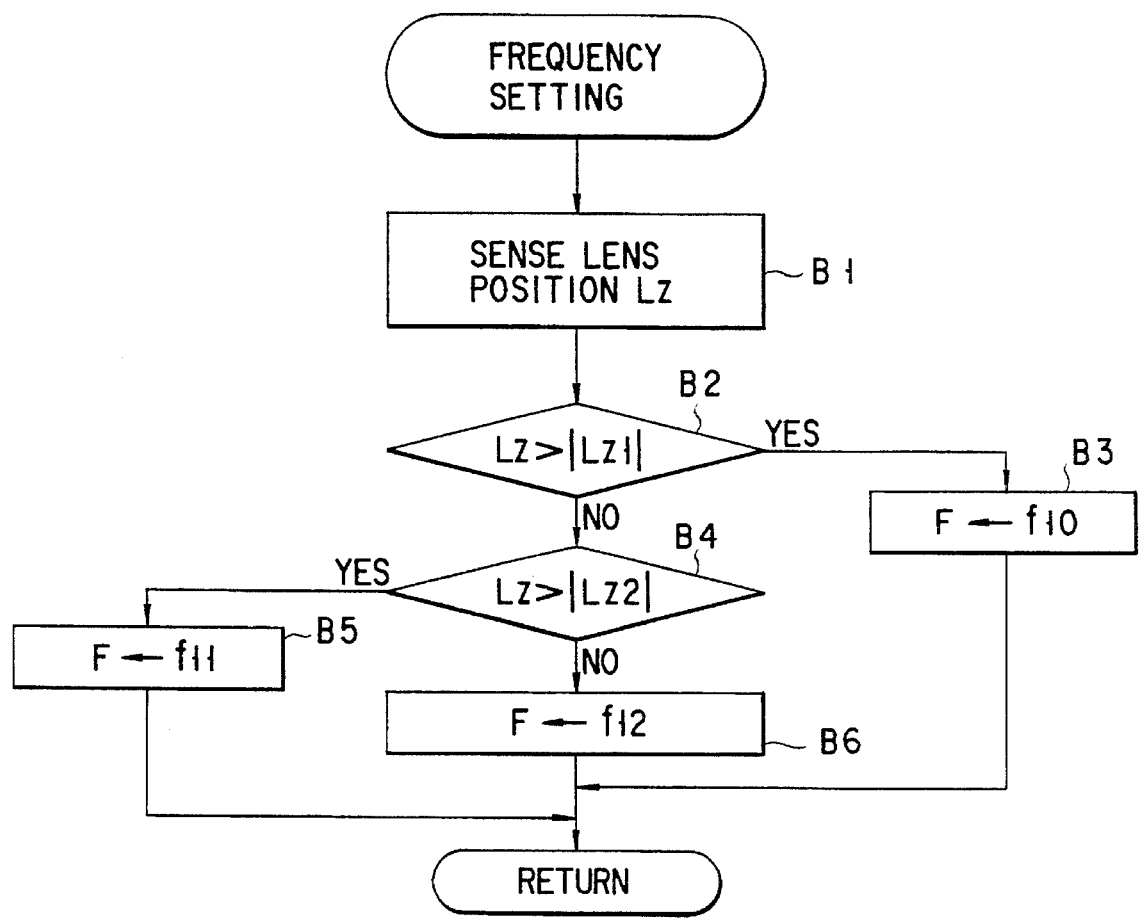
FIG. 11 is a flowchart for explaining the operation of selecting frequencies.

FIG. 11 is a flowchart for explaining the operation of selecting frequencies.

When the subroutine program for frequency setting is started, the present position of the lens 24 is read (step B1). Then, the position of the lens 24 is judged for Lz>Lz1. (step B2): in FIG. 12, when Lz>Lz1 is true, the frequency to sensed F is set to f10 (step B3), whereas when Lz>Lz1 is false, the lens position is judged again for Lz>Lz2 (step B4).

At step B4, when Lz>Lz2 is true, the frequency to sensed F is set to f11 (step B5). When Lz>Lz2 is false, the frequency F is set to f12 (step B6). After this, this subroutine program is terminated.

Figure 12:
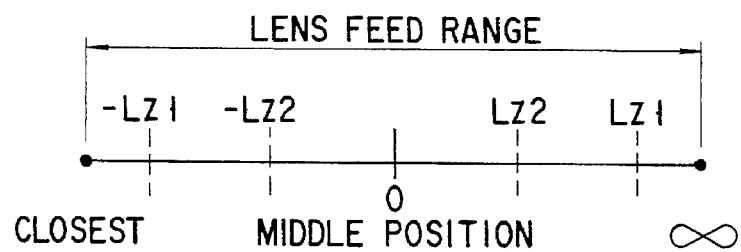
FIG. 12 shows relationship between the lens position in overall feed and frequency switching point.

FIG. 12 shows the relationship between the position of the overall feed lens and the frequency switching point, with the middle position of the feed range lens being 0. For those other than overall feed lenses, the middle position of pint range may be used in place of the middle position of the feed range.

With this arrangement, it is possible to provide a fast, simple in-focus sensing device independent of the state of the subject.

while in this embodiment, DFT processing is done in frequency sensing, other forms of processing such as digital filters or analog filters may be used as long as they can sense a narrow frequency band.

The sensing of frequency components may be done by parallel processing.

The number of frequencies to be sensed may be more than one in the range fulfilling the conditions of FIG. 7.

In this embodiment, the switching of frequencies to be sensed is done three times according to lens position. The switching may be done more than three times.

Other optical path length changing means may be used. For instance, an optical path length may be changed by driving the lens in time-sharing.

As described above, according to the first to third embodiments, the space frequency components are extracted from the two image signals with different in-focus states to determine the in-focus point from the ratio of the extracted frequency components. Therefore, the frequencies to be sensed can be switched on the basis of the outputs and sensed defocus range independent of the subject. This makes it possible to provide a fast, high-accuracy in-focus sensing device.

FIG. 13 is a schematic block diagram of a camera to which an in-focus sensing device according to a fourth embodiment of the present invention is applied. In the figure, the lens side is composed of an optical system 101, a driving section 102 for driving the optical system 101, and a memory section 103 for storing the coefficients used in expressing the frequency component ratio with a specific optical path difference and the defocus amount by approximate functions, based on the frequency components from the optical system 101 and the defocus amount.

The body side is made up of an optoelectric transducer 104, a frequency sensing section 105 for sensing a specific frequency component from the output of the optoelectric transducer 104, a frequency component ratio sensing section 106 for sensing the ratio of the outputs with a specific optical path difference from the frequency sensing section 105, and a defocus amount computing section 107.

With this arrangement, as the luminous flux from the subject passes through the optical system 101, the optical distribution of the subject is converted into an electrical distribution at the optoelectric transducer 104. The frequency sensing section 105 senses a specific frequency component from the output of the optoelectric transducer 104. Then, the frequency component ratio sensing section 106 senses the ratio of the outputs with a specific optical path difference from the frequency sensing section 105.

Based on the output of the frequency component ratio sensing section 106, the information on the type of the optical system 101, the information on a specific optical path difference, and the coefficient switching value, the defocus amount computing section 107 selects a specific function from the functions stored by coefficient parameters, reads the coefficients of the specific function from the memory section 103, and calculates the defocus amount based on the selected approximate function. The computing section 107 receives the present position of the optical system 101 from the driving section 102. Based on this position, it calculates the driving amount of the optical system 101, and causes the driving section 102 to drive the optical system 101 according to the amount computed. The coefficients have been stored in the memory section 103 for at least each optical path difference and each frequency.

As mentioned earlier, a method of sensing the in-focus point based on the frequency component ratio has been disclosed in detail in Published Unexamined Japanese Patent Application No. 2-275916.

Figure 15:
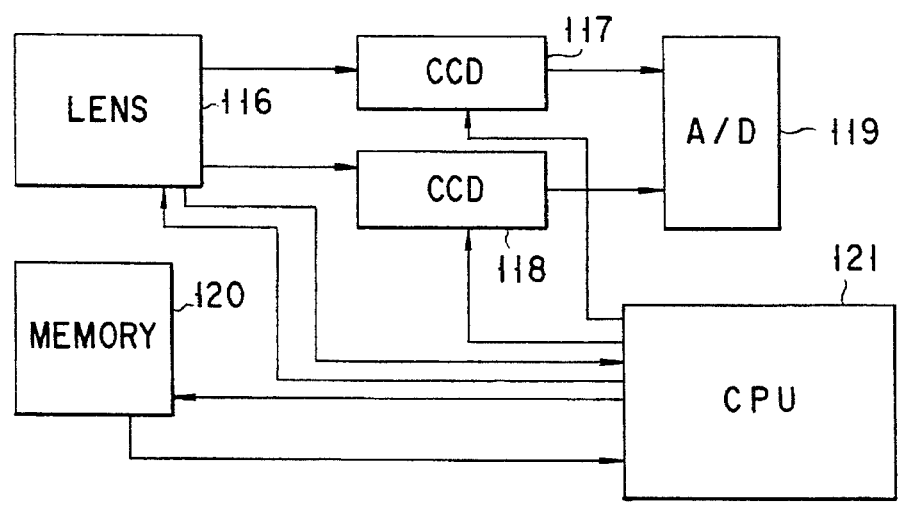
FIG. 15 is a block diagram of a camera according to a fifth embodiment of the present invention.

FIG. 15 is a block diagram of a camera to which an in-focus sensing device according to a fifth embodiment of the present invention is applied. The fifth embodiment has a similar construction to that of FIG. 3. The camera contains a lens 116, and a first and second sensors CCDs 117 and 118 for converting the luminous fluxes with different optical path lengths passing through lens 116 into electric signals (those sensors have a sensor optical path difference of ds, with the film equivalent surface between them). It also contains an A–D converter circuit 119 for converting the signals from the sensors CCDs 117 and 118 into digital signals, a memory 120, and a CPU (Central Processor Unit) 121 for controlling the lens 116, first and second sensors CCDs 117 and 118, and memory 120.

The memory 120 stores the coefficients of approximate functions for the relationship between the frequency component ratio and defocus of the lens 116, and the frequency component ratios for switching approximate functions, for each interval between the first and second sensors CCDs 117 and 118 and for each frequency. The CPU 121 extracts specific frequency components from the digital signals from the A–D converter circuit 119 to determine the frequency component ratio, and senses the defocus amount based on the frequency component ratio and the coefficients from the memory 120. It also computes the driving amount of the lens 116, and based on this amount, drives the lens 116 and the first and second sensors CCDs 117 and 118.

The operation of the camera thus constructed is the same as that described in the FIG. 5 flowchart, so that its explanation will be omitted.

Figure 16:
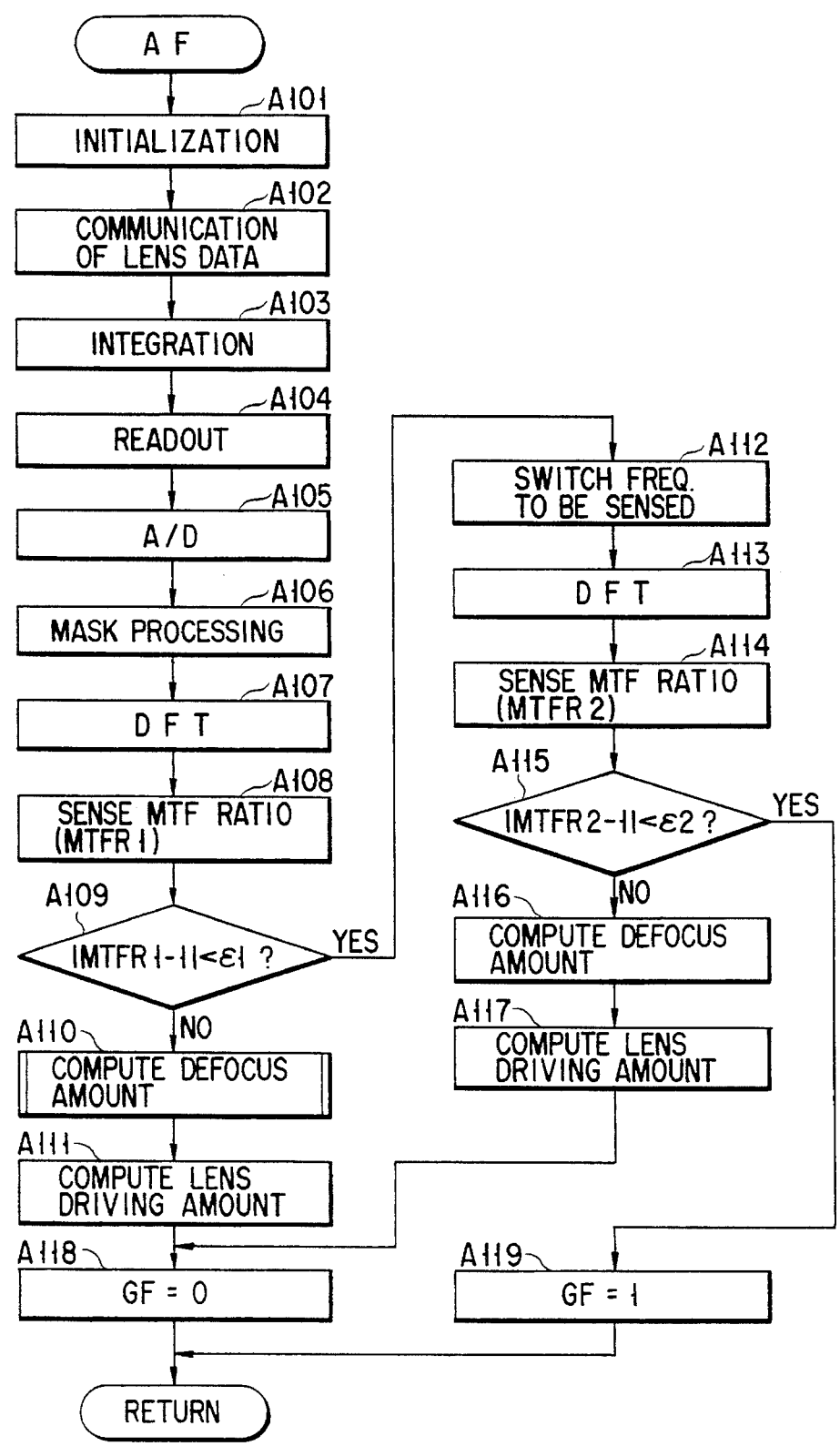
FIG. 16 shows the sequence of the subroutine program AF in the fourth embodiment.

FIG. 16 shows the sequence of the subroutine program of FIG. 5 in the fifth embodiment.

When the subroutine program AF is started, initialization is first performed (step A101). The characteristics and present position of the lens 116 are then sensed (step A102). Next, the outputs of the first and second sensors CCDs 117 and 118 are integrated (step A103). After integration, the signals from the first and second sensors CCDs 117 and 118 are read out (step A104).

These read-out signals are A–D converted into digital data in real time for storage (step A105). The digital data undergoes mask processing (Gaussian mask: sensing errors due to discontinuity at both ends of the sensor signal are eliminated by multiplying the image signal by the coefficient of the Gaussian distribution) (step A106). Based on the position and frequency of the lens 116 at step A102, the frequency to be sensed f1 is set. The frequency f1 is sensed by digital processing (Discrete Fourier Transform) at the CPU 121 (step A107).

Then, the ratio (MTFR 1) of frequency components from the two sensors with a specific optical path difference is sensed (step A108). The MTFR is compared with the specific value ∈1 (included in the information on the lens 116 and varying with the frequency to be sensed f1) (step A109).

When |MTFR–1|<∈1 is false, the defocus amount at the frequency f1 is computed by a specific approximate function based on the MTFR1 and the information on the lens 116 (the function switching MTFR1 and the coefficients of the function) (step A110). Based on the computed defocus amount and present position of the lens 116, the driving amount L1 of the lens 116 is calculated (step A111).

On the other hand, at step A109, when |MTFR–1| <∈1 is true, this means that the lens 116 is already in the vicinity of the in-focus point. Therefore, to raise the in-focus sensing accuracy, the frequency to be sensed is changed from f1 to a higher frequency f2 (f2 is such a frequency that the interval between the two sensors is less than Z0 in the lens frequency component versus defocus amount characteristics of FIG. 7) (step A112). Next, the frequency f2 is sensed by digital processing (DFT) (step A113), and the ratio (MTFR2) of the frequency components from the two sensors with a specific optical path difference is sensed (step A114).

After this, the MTFR2 is compared with the specific value ∈2 (included in the information on the lens 116 and differing with the frequency to be sensed f2) (step A115). Here, when |MTFR2–1|<∈2 is false, the defocus amount at the new frequency f2 is computed on the basis of the MTFR2 and the information on the lens 116 (the function switching MTFR1 and the coefficient of the function) (step A116). The driving amount L2 of the lens 116 is calculated on the basis of the computed defocus amount and the present position of the lens 116 (step A117). After the driving amount has been computed, the in-focus flag GF is set to GF=0 (step A118).

On the other hand, at step A115, when |MTFR2–1| <∈2 is true, the in-focus flag GF is set to GF=1 (step A119), and then the subroutine program AF is terminated.

For the specific frequencies of the lens used in this embodiment, the frequency component versus lens defocus characteristics is the same as that in FIG. 7.

The way of setting comparison values ∈1 and ∈2 for MTFR is the same as explained in FIG. 8.

Figure 17:
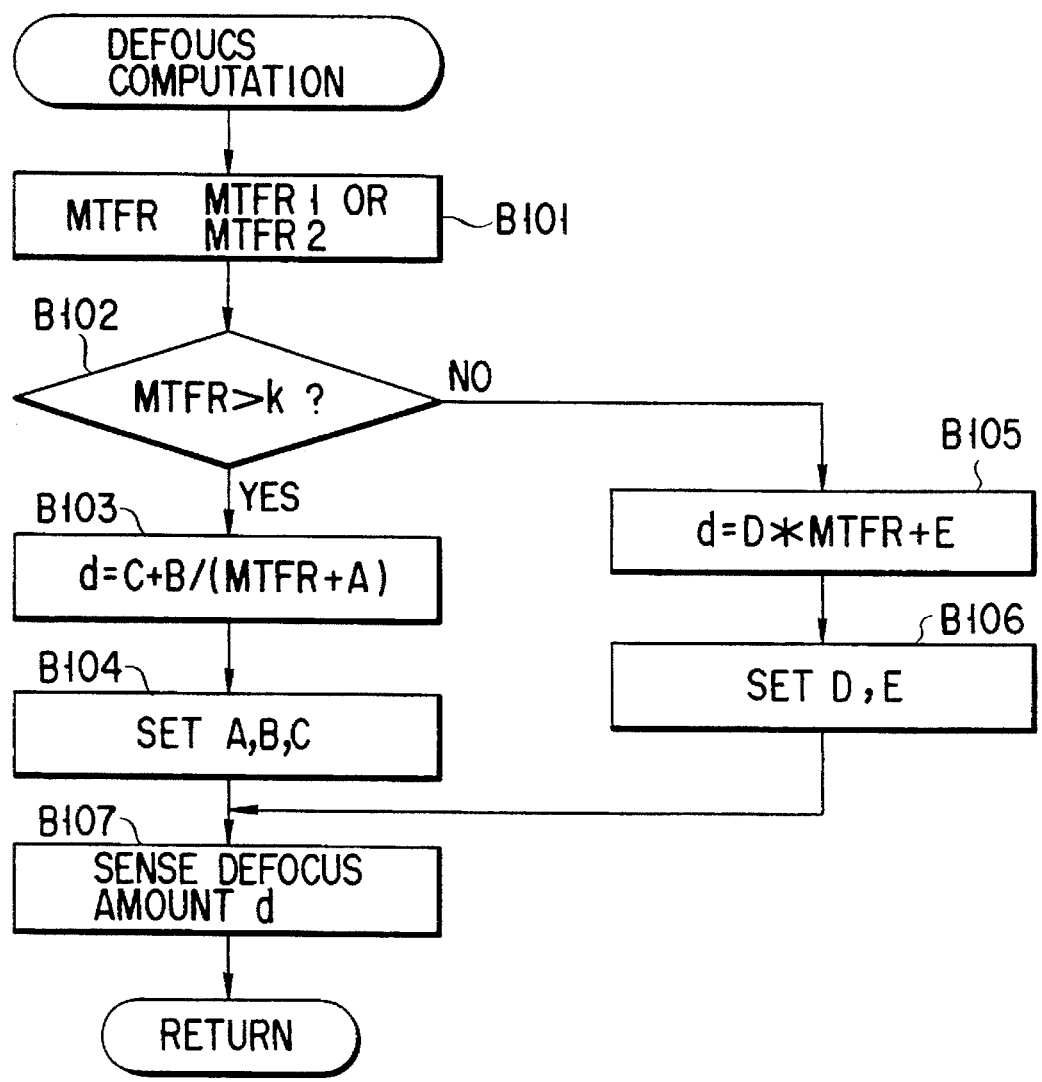
FIG. 17 is a flowchart for explaining the operation of computing the defocus amount.

Referring to a flowchart shown in FIG. 17, how to calculate the defocus amount of the lens 116 will be explained.

Figure 14:
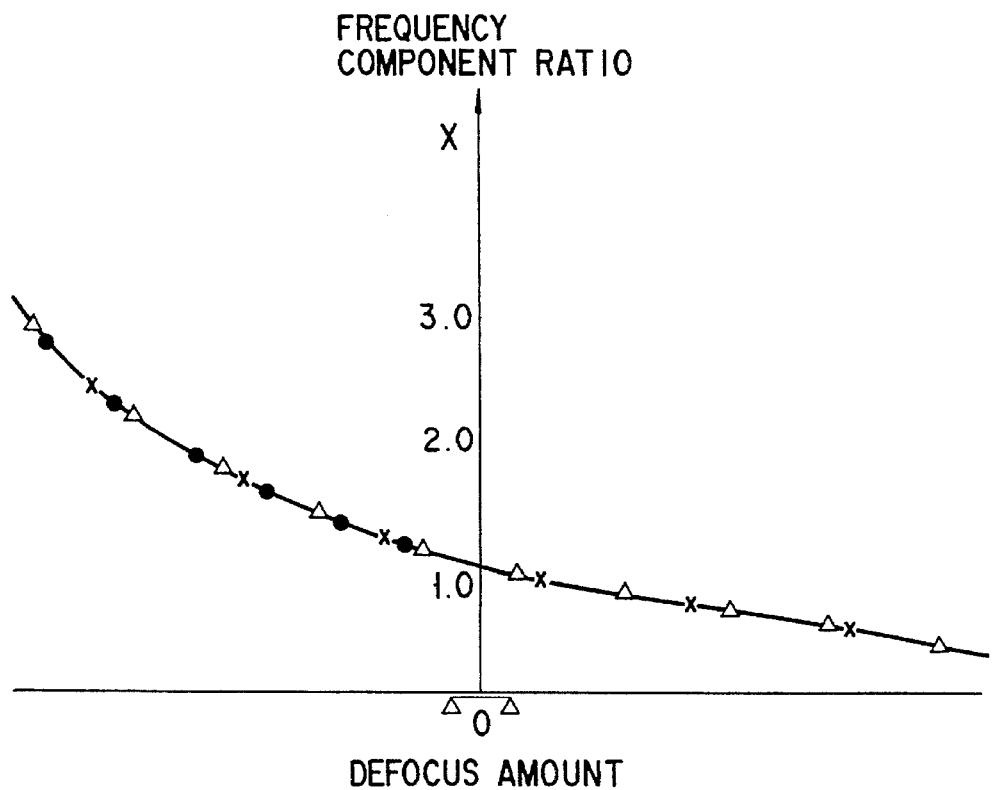
FIG. 14 shows the frequency component versus defocus characteristics.
Figures 18, 19:
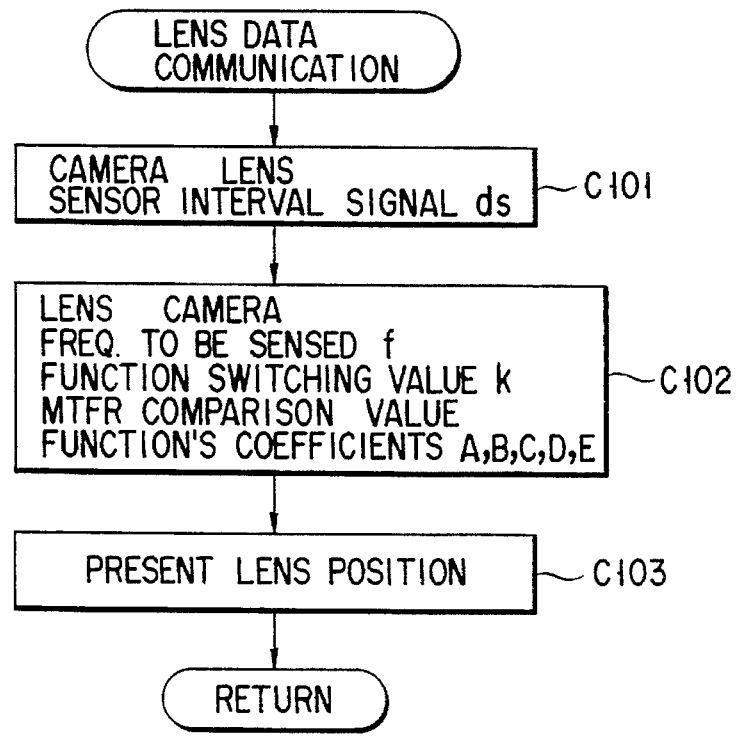
FIG. 18 is a table listing equations used in obtaining the functions for approximating the relationship between the MTFR corresponding to the sensed frequency and the defocus amount.
FIG. 19 shows a subroutine for explaining the communication of lens data.

Approximate functions for the relationship between the MTFR corresponding to the sensed frequency and the defocus amount are expressed by hyperbolic and linear functions with the function switching MTFR on the borderline (related equations are listed in FIG. 18). For a lens with the characteristics of FIG. 14, if the function switching MTFR meets k=1 and MTFR>k, the defocus amount d will be:

$$d = C + B/(MTFR+A)$$

$$;C = -2.36\ B = 3.09\ A = 0.31 \qquad (1)$$

When MTFR>k is false, the defocus amount d will be:

$$d = D*MTFR + E$$

$$;D = -2.2\ E + 2.2 \qquad (2)$$

When the defocus computation in the subroutine program is started, the sensed MTF ratios MTFR1 and MTFR2 at the sensed frequency are substituted into MTFR (step B101). Then, the MTFR is compared with the function switching value k (step B102). Here, when MTFR>k is true, the function expressed by equation (1) will be set (step B103). Then, coefficients A, B, and C are set on the basis of the information on the lens 116 (step B104).

On the other hand, at step B102, when MTFR>k is false, the function expressed by equation (2) is set (step B105). Then, coefficients D and E are set according to the information on the lens 116 (step B106).

After this, the defocus amount d is calculated using a specific function (step B107), and this subroutine is terminated.

FIG. 19 shows a subroutine describing the communication of lens data.

When the subroutine program is started, the camera sends to the lens a communication start signal and a signal of the interval ds between two sensors (step C101). Then, the lens sends to the camera a communication start signal and the data on in-focus sensing (the frequency to be sensed f, function switching MTFR k, MTFR comparison value ∈ for the frequency, and coefficients A, B, C, D, and E of the functions) for the frequencies stored on the lens side (step C102).

After the present lens position has been transmitted to the camera (step C103), this subroutine is terminated.

With this configuration, it is possible to provide a fast, simple in-focus sensing device independent of the state of the subject.

While in this embodiment, DFT processing is done in frequency sensing, other forms of processing such as digital filters or analog filters may be used as long as they can sense a narrow frequency band.

In this embodiment, the switching of frequencies to be sensed is done three times according to lens position. The switching may be done more than three times.

The number of frequencies to be sensed may be more than one in the range fulfilling the conditions of FIG. 7.

Other optical path length changing means may be used. For instance, an optical path length may be changed by driving the lens in time-sharing. The number of sensors may be one, in which case the sensor may be moved using relay lenses.

Although the film equivalent surface is placed between sensors, it is not necessarily placed there. The sensors may be arranged in other ways.

Figure 20A:
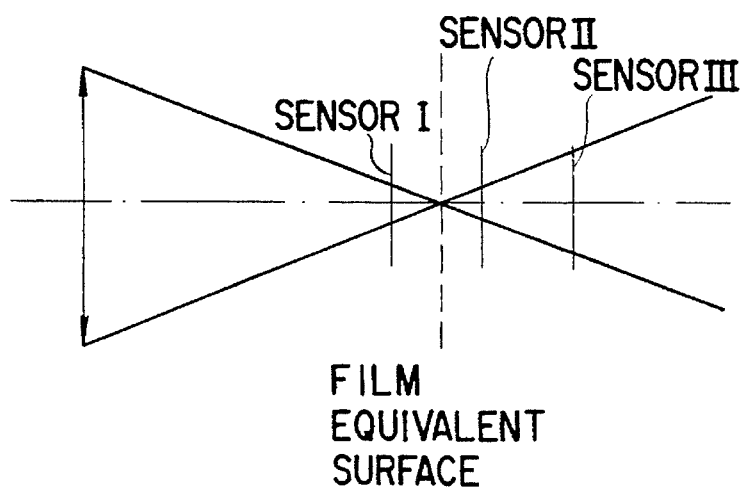
FIGS. 20A and 20B show the arrangement of sensors with respect to the equivalent surface of the film.
Figure 20B:
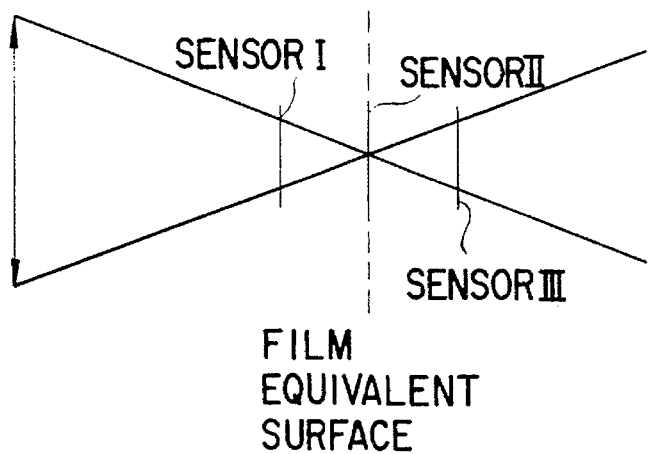

Specifically, as shown in FIG. 20A, the film equivalent surface may be placed between sensors I and II so that the interval between sensors I and II may be the minimum and that between sensors I and III may be maximum. Further, as shown in FIG. 20B, sensor II may be put on the film equivalent surface so that the interval between sensors I and II or sensors II and III may be the minimum, and that between sensors I and III may be the maximum. Consequently, with sensors arranged as shown in FIG. 20A or 20B, accuracy may be assured in a place where the interval between sensors is the smallest. Places where the interval is larger may be used for large defocuses.

A reduced-size optical system may be used to make the sensor more compact.

The defocus amount may be obtained by simply changing the coefficients of the linear function in equation (1).

FIG. 21 is a block diagram of a sixth embodiment of the present invention. The same parts as those in FIG. 15 are indicated by the same reference characters, and their explanation will be omitted.

In the figure, the body side is composed of sensors CCDs 117 and 118 for converting luminous fluxes with different optical path lengths passing through the lens 116 into electric signals (these sensors have a sensor optical path difference of ds with the film equivalent surface between them), an A–D converter circuit 119 for converting the signals from the sensors CCDs 117 and 118 into digital signals, and a main CPU (MCPU) 121a for extracting specific frequencies from the digital signals from the sensors CCDs 117 and 118 to sense the ratio of the same frequency components (MTFR), integrates the outputs of sensors CCDs 117 and 118, and reads out the integrated values.

The lens side is made up of the lens 116, a lens CPU (LCPU) 121b for sensing the defocus amount on the basis of the sensed frequency and approximate functions for the relationship between the frequency component ratio and defocus of the lens 116 for each sensor interval, and for computing the driving amount on the basis of the present position of the lens 116, and a memory 120 for storing the coefficients of the functions for each frequency.

In the sixth embodiment, the sequence is performed in the same manner as explained in the fifth embodiment except for lens data communication.

With this configuration, the approximate functions can be optimized for each lens. By storing the information on the lens side, it is possible to reduce the memory capacity on the body side. These features make it possible to provide a fast, simple in-focus sensing device.

Since in the fourth to sixth embodiments, space frequency components are extracted from two image signals with different in-focus states, the ratio of them is expressed by approximate functions, and only the coefficients of those functions are stored, this makes it possible to reduce the data volume. Further, this approach allows the in-focus sensing device to accommodate with interchangeable lenses more easily. Because approximate functions are switched on the basis of the ratio of space frequencies sensed, it is possible to sense the in-focus point with high accuracy using optimum approximate functions.

Further, storing the approximate functions on the lens side makes it unnecessary to provide the functions peculiar to the lens for the camera body side. This makes it possible to provide a highly accurate in-focus sensing device with simple design.

Referring to FIG. 22, a seventh embodiment of the present invention will be described.

In the figure, an optical system 201 directs the luminous flux from the subject to an optoelectric transducer 202. The optoelectric transducer 202 converts the distribution of the light from the subject passing through the optical system 201 into an electrical distribution. A frequency sensing circuit 203 extracts and stores frequency components from the output of the transducer 202. A frequency component judging circuit 204 compares the stored frequency components with a specific value to judge the degree of the sensed frequencies.

Receiving the output from the frequency sensing device 203, a frequency component ratio sensing device 205 computes the ratio of frequency components with different optical path lengths for more than one frequency. Based on the results from the frequency component judging circuit 204 and frequency component ratio sensing circuit 205, a defocus amount computing device 206 senses the defocus amount, referring to a table 207. It then determines the reliability of the defocus amount sensed on the basis of the degree of the sensed frequency from the frequency component judging circuit 204 and the ratio of frequency components at a frequency lower than the frequency sensed at the frequency component ratio sensing circuit 205. It also senses the position of the optical system 201 and drives the optical system 201 to the in-focus position. The table 207 stores the relationship between the frequency component ratio and defocus amount.

The defocus amount computing device 206 compares the ratio of frequency components lower than the frequency used in defocus sensing with a specific value $\epsilon$ (determined by the sense frequency for evaluation) to evaluate the reliability of the defocus value obtained from the sensed frequency component ratio. When the evaluation is unacceptable, the frequency to be sensed is changed.

FIG. 23 is a block diagram of a camera to which an eighth embodiment of the present invention is applied. The camera is composed of a lens 301, sensors CCDa 302 and CCDb 303 for converting the luminous fluxes passing through the lens 301 into electric signals, an amplifier 304 for amplifying the signals from the sensors, an A–D converter circuit 305 for converting the output of the amplifier into a digital signal, a DFT circuit 306 for extracting a specific frequency component from the digital signal, a CPU 307 for controlling the sensors 302 and 303 according to the present position of the lens 301, sensing the ratio of frequency components with different optical path lengths, and computing the driving amount of the lens 301, a memory 308 for storing the frequency component ratios for more than one frequency and communicating with the CPU, and a driving circuit 309 for driving the lens 301 to the in-focus point.

Figure 24:
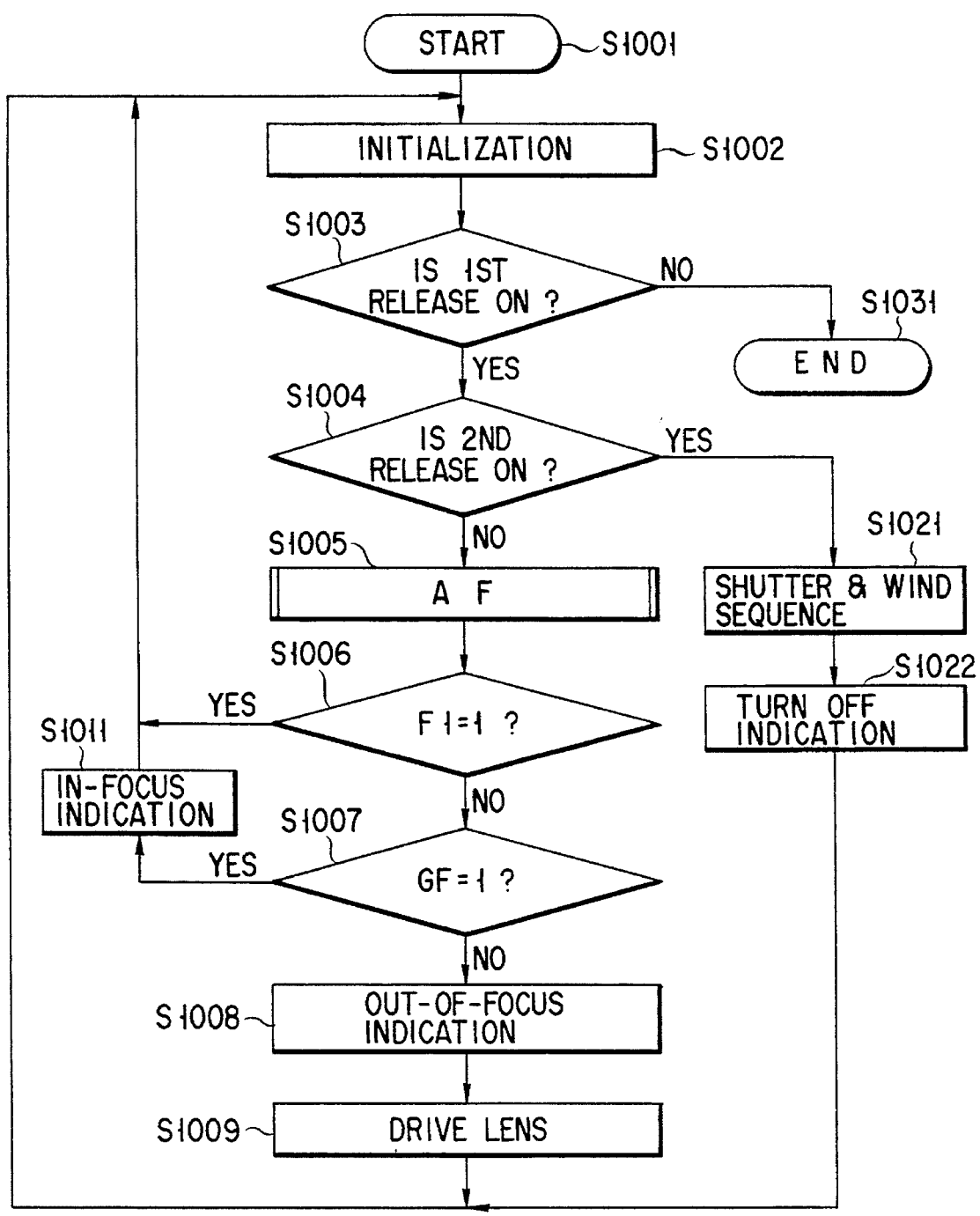
FIG. 24 is a flowchart for explaining the main routine of FIG. 23.

FIG. 24 shows the main sequence.

when the main sequence is started (step S1001), initialization is first carried out (step S1002). Then, a check is made to see if a first release is on (step S1003). When the first release is off, the sequence is terminated (step S1031). When the first release is on, a check is made to see if a second release is on (step S1004).

When the second release is on, the shutter and wind sequences are performed (step S1021). After the in-focus information has been erased from the screen (step S1022), flow returns to step S1002.

When the second release is off, the subroutine program AF is executed (step S1005), and then the flag FI for interruption is judged (step S1006). When the flag FI is FI=1, flow returns to step S1002. In this embodiment, for example, when interruption occurs for input of a release signal in the subroutine program, the flag F1 is FI=1.

When the interruption flag FI is FI=0 (no interruption has occurred yet in the subroutine program AF), the in-focus flag GF is judged: when the lens 201 is in the in-focus position, GF=1, and when the lens 301 has to be driven in an out-of-focus position, GF=0.

When GF=1, an in-focus indication is displayed on the screen (at step S1011), and then flow returns to step S1002. When GF=0, an out-of-focus indication is displayed on the screen (step S1008), and the lens 301 is driven to the position specified by the subroutine program AF. After this, flow returns to step 1002 (step S1009).

Figure 25:
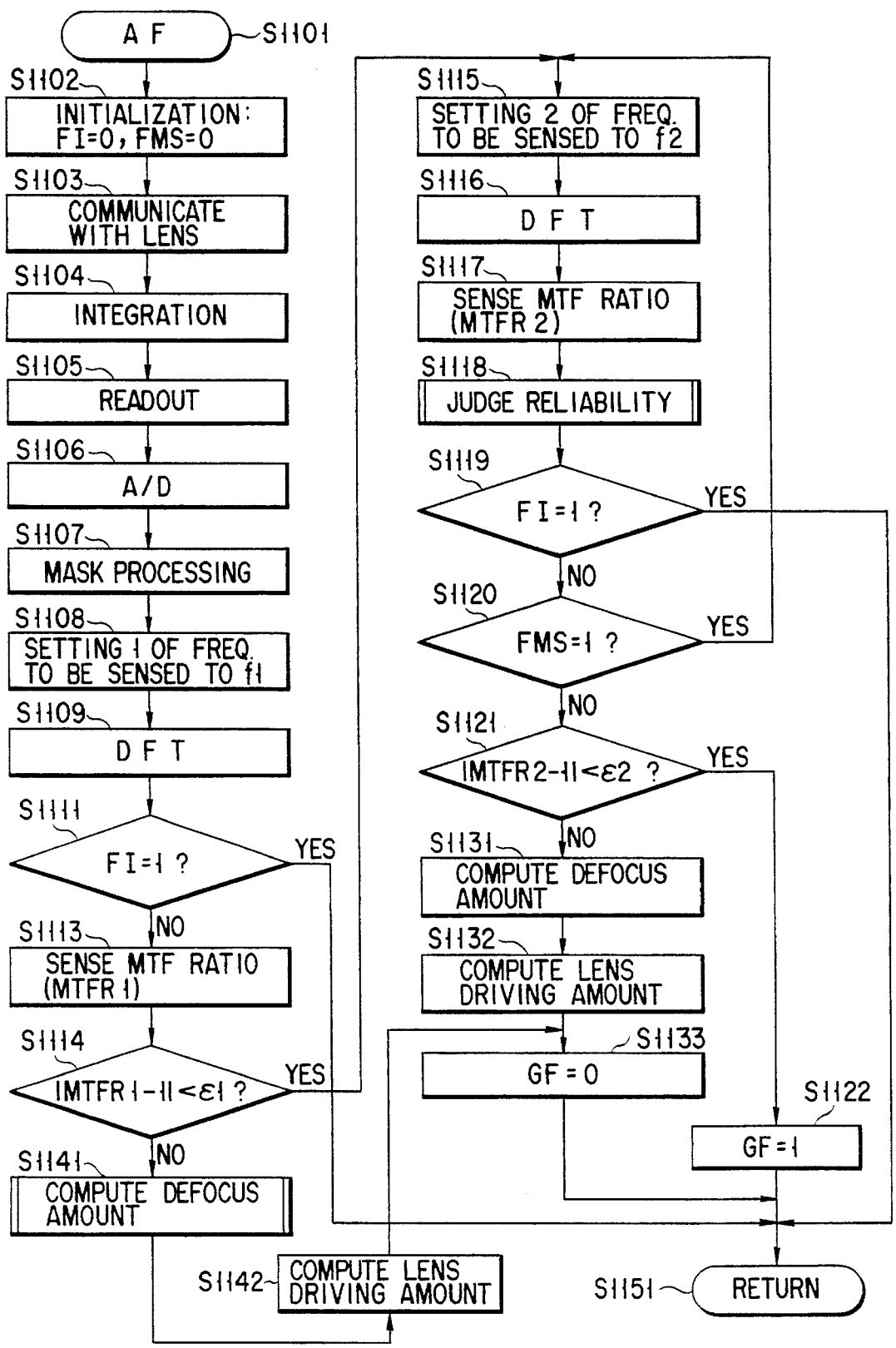
FIG. 25 shows the sequence of the subroutine program AF of FIG. 24.

FIG. 25 shows the sequence of the AF subroutine program.

When the subroutine program is started (step S1101), initialization is first carried out (step S1102). Then, communication with the lens section is made for lens information including frequency, lens position, opening, state judgment, and sensed defocus range (step S1103).

Then, the output of the sensor (CCD) 302 is integrated (step S1104). After integration, the sensor signal is read out (step S1105), A–D converted into digital data for storage (step S1106), and undergoes mask processing (both ends of a specific area extracted from consecutive images are processed with a mask of Gaussian function or the like) (step S1107).

Setting 1 of frequency to be sensed is done by executing the subroutine of setting the frequency to be sensed to f1 (step S1108). The frequency f1 is sensed by performing digital processing (DFT) (step S1109).

Then, the interruption (first release OFF) flag FI is judged (step S1111). When FI=1 (an interruption has occurred), flow goes to step S1151. When FI=0 (no interruption has occurred), the ratio (MTFR1) of frequency components from two sensors with a specific optical path difference is sensed (step S1113). Then, the MTFR1 is compared with the specific value $\varepsilon 1$ (step S1114). When $|MTFR-1|<\varepsilon 1$ is false, the table in which the MTFR1 and the defocus amount at the frequency f1 of the lens 301 are stored is referred to, and the defocus amount is interpolated for correction (step S1141). Then, based on the defocus amount, the driving amount L of the lens 301 is computed (step S1142).

When $|MTFR-1|<\varepsilon 1$ is true, this means that the lens 301 is already in the vicinity of the in-focus point. Therefore, to raise the in-focus sensing accuracy, setting 2 of the frequency to be sensed is done, that is, the frequency to be sensed is changed from f1 to a higher frequency f2 (f2 is such a frequency that the interval between two sensors may be less than Z0 in the lens frequency component versus defocus amount characteristics in FIG. 7).

Then, after the frequency f2 has been sensed by digital processing (DFT) (step S1116), the ratio (MTRF2) of frequency components from two sensors with a specific optical path difference is sensed (step S1117).

Next, at step S1118, the reliability of the ratio of sensed frequency components is evaluated. Then, the interruption flag FI is judged (step S1119). When FI=1 (an interruption has occurred), flow goes to step S1151, whereas when FI=0 (no interruption has occurred), the flag FMS is judged: when the reliability of the sensing accuracy is unacceptable, FMS=1 (step S1120).

When FMS=1 (the reliability of the sensed frequency ratio MTFR 2 is unacceptable), flow returns to step S1115 to change the frequency f2 (to a lower frequency). When FMS=0 (the reliability of the sensed frequency ratio is acceptable), the MTFR2 is compared with the specific value $\varepsilon 2$ for in-focus judgment (step S1121). When $|MTFR-2|<\varepsilon 2$ is false, the table in which the MTFR2 and the defocus amount at the frequency f2 of the lens 201 are stored is referred to, and the defocus amount is interpolated for correction (step S1131). Then, based on the defocus amount, the driving amount L of the lens 201 is computed (step S1132).

When $|MTFR-2|<\varepsilon 2$ is true, this means that the lens 301 is already in the in-focus range, and then the in-focus flag is set to GF=1 (step S1122). When the lens is in the out-of-focus range, the in-focus flag is set to GF=0 (step S1133). After this, the subroutine program AF is terminated (step S1151).

At the specific frequencies of the lens used in this embodiment, the frequency component versus lens defocus characteristics are the same as those in FIG. 7. The way of setting comparison values $\varepsilon 1$ and $\varepsilon 2$ for MTFR is the same as that in FIG. 8.

Figure 26:
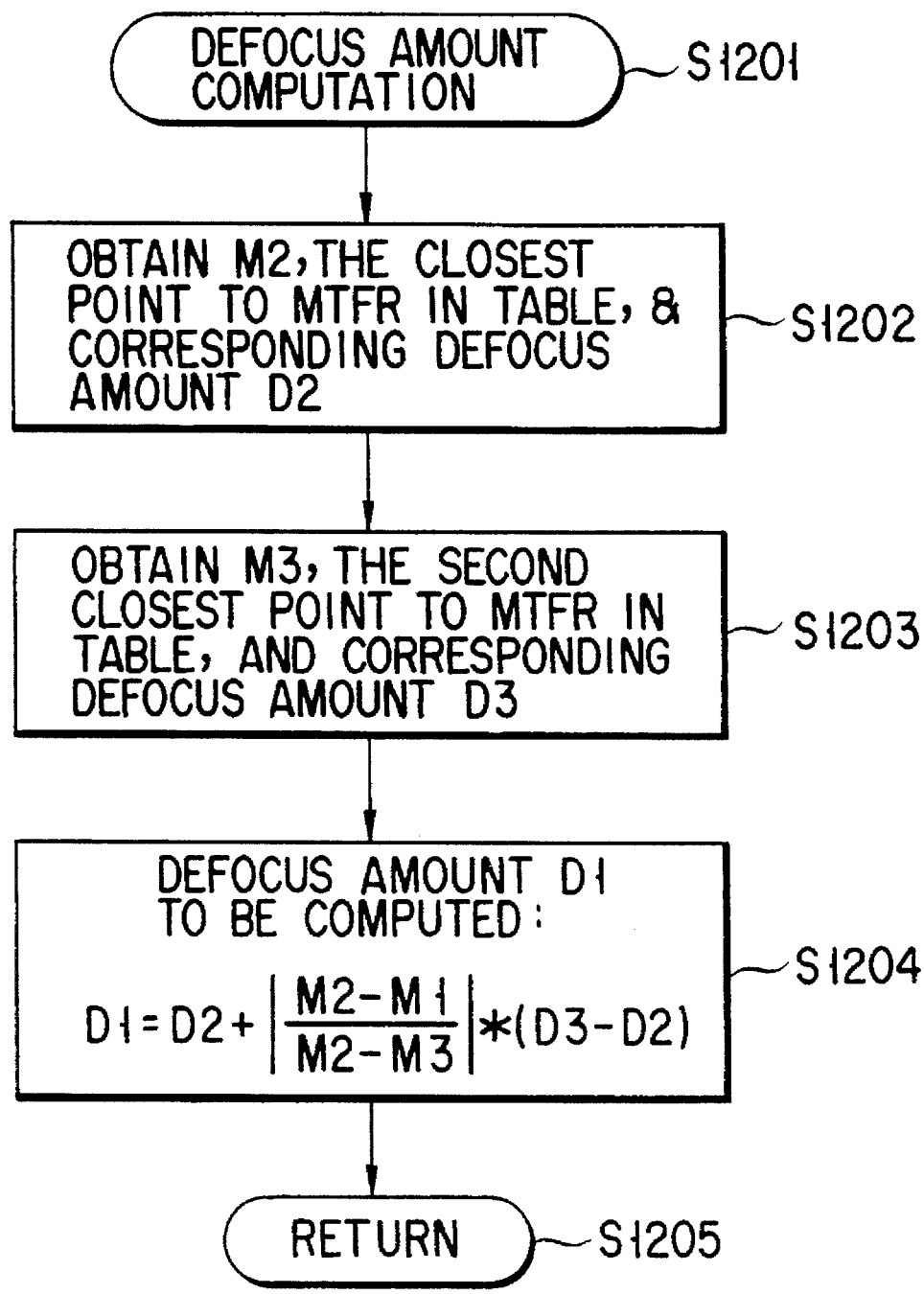
FIG. 26 is a flowchart for explaining the operation of computing the lens defocus amount.

Referring to FIG. 26, how to compute the defocus amount of the lens 301 will be described. The MTFR is sensed using the table showing the relationship between the MTFR corresponding to the frequency to be sensed and defocus amount (defocus points are sampled in a discrete manner).

It is assumed that the sensed MTFR is M1, the defocus amount to be obtained is D1, the MTFR closest to M1 in the reference table is M2, the defocus amount corresponding to M2 is D2, the MTFR next closest to M1 is M3, and the defocus amount corresponding to M3 is D3.

When the flow of computing the defocus amount is started (step 1201), M2 and M3 are obtained from the reference table at steps S1202 and S1203, respectively. Then, the defocus amount D1 for M1 is computed using the following equation (step S1024):

$$D1=D2+|(M2-M1)|/(M2-M3)|*(D3-D2)$$

After this, this sequence is terminated (step S1206).

Figure 27:
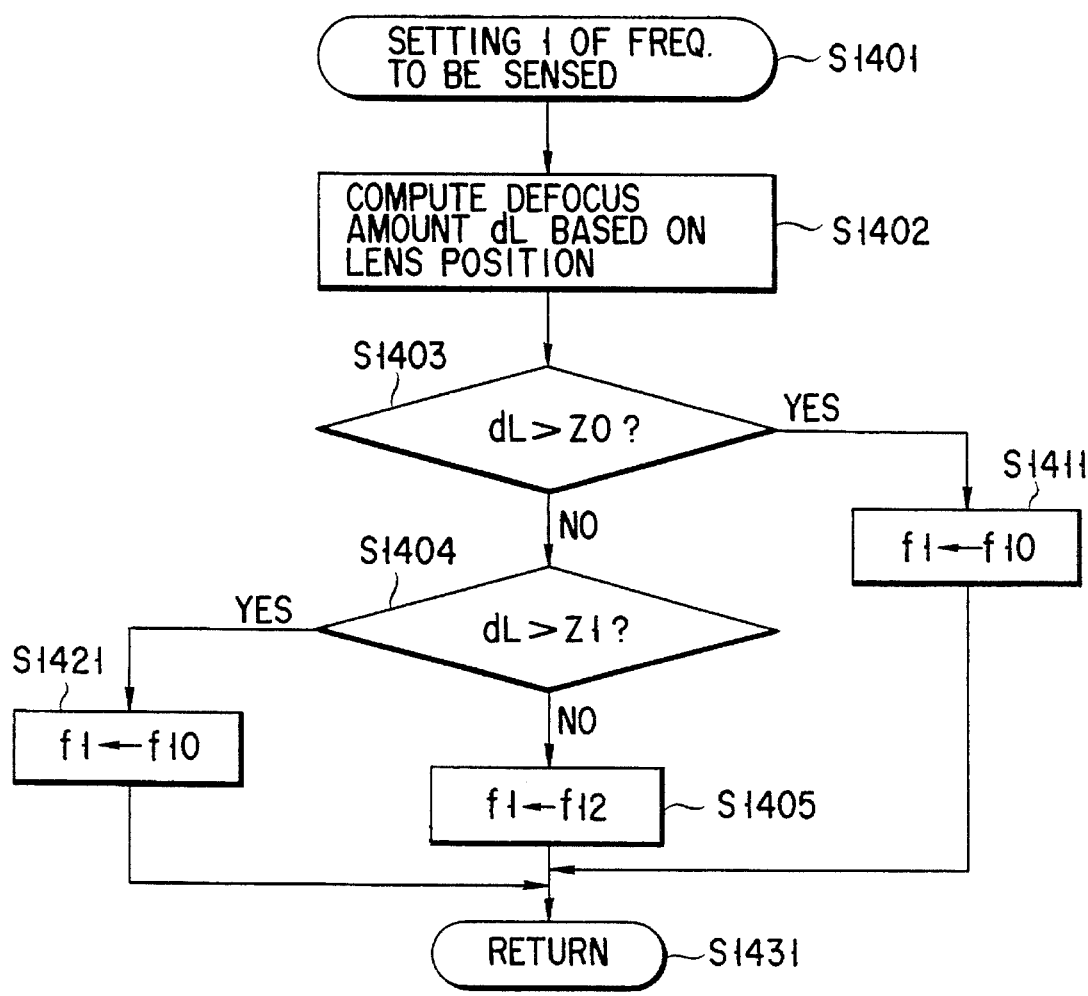
FIG. 27 is a flowchart for setting 1 of the frequency to be sensed.

Referring to FIG. 27, setting 1 of the frequency to be sensed will be explained.

When the subroutine for setting 1 of the frequency to be sensed is started (step S1401), the defocus amount to be sensed dL is first computed from the present position of the lens (step S1402). Then, it is judged whether the defocus amount dL is larger than Z0 (see FIG. 7) (step S1403). When dL>Z0 is true, f10 is substituted into f1 (see FIG. 7), and then flow goes to step S1431 (step S1411).

When dL>Z0 is false, it is judged whether the defocus amount dL is larger than Z1 (see FIG. 7) (step S1404). When dL>Z1 is true, f11 is substituted into f1 (see FIG. 7), and then flow goes to step S1431 (step S1421). When dL>Z1 is false, f12 is substituted into f1 (step S1405), and then the present sequence is terminated (step S1431).

Referring to FIG. 28, setting 2 of the frequency to be sensed will be explained.

When the subroutine for setting 2 is started (step S1301), initialization is performed to substitute f2 into fa (step S1302). Then, the FMS flag is judged for reliability: when the reliability is unacceptable, FMS=1 (step S1303). When the FMS flag is not FMS=1, the frequency to be sensed fa (the initial value of fa corresponds to f2 in FIG. 7) is set in as a high frequency band as possible so as to cover the sensed defocus range as shown in FIG. 6. The fa is substituted into f2 (steps S1304 and S1306).

When the FMS flag is FMS=1, the frequency to be sensed is set to (fa)/b, which is substituted into f2 (steps S1311 and S1313) with a specific value b:1<b<4. After this, the present sequence is terminated (step S1321).

Figure 29:
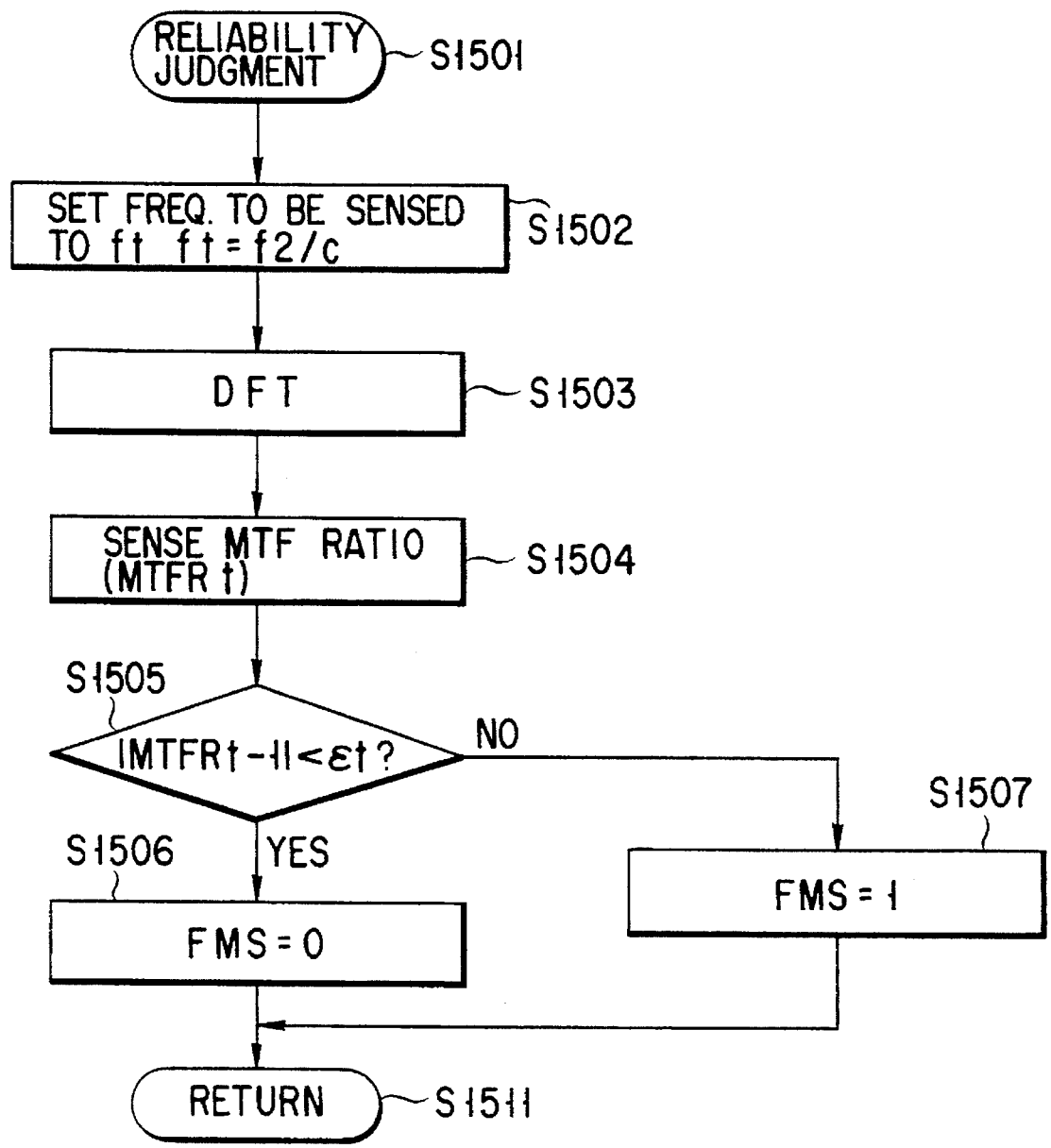
FIG. 29 is a flowchart of judging the reliability.

FIG. 29 shows the flow of judging the reliability.

When the flow is started (step S1501), the frequency to be sensed for evaluating the reliability ft is set (ft=f2/c where a specific value C:1<C) (step S1502). Then, the frequency ft is sensed by DFT operation (step S1503). Next, the MTF ratio (MTFRt) of frequency components from two sensors is sensed (step S1504). After this, a judgment is made for $|MTFRt-1|<\varepsilon t$ (step S1505). Here, when $|MTFRt-1|<\varepsilon t$ is true, the FMS flag is set to FMS=0 (step S1506). When $|MTFRt-1|<\varepsilon t$ is false, the FMS flag is set to FMS=1 (step S1507), and then the sequence is terminated (step S1511). $\varepsilon t$ is a value peculiar to the frequency to be sensed ft for evaluation.

With this arrangement, it is possible to provide a fast, simple, highly accurate in-focus sensing device which always monitors the in-focus state with the frequency ratio, comparing with specific value without preparing an additional table.

While in this embodiment, DFT processing is done in frequency sensing, other forms of processing such as digital filters or analog filters may be used as long as they can sense a narrow frequency band.

In the embodiment, the switching of the frequency to be sensed is done twice. The sensing of frequency components may be done by parallel processing and the frequencies to be sensed be changed several times.

Other optical path length changing means may be used. For example, the lens may be driven in a time-sharing manner to change the optical path length.

Sensors are placed on two planes in the embodiment. They may be placed on more than two planes as shown in FIGS. 20A and 20B.

Although the ratio of two frequency components is used, defocus sensing may be done on the basis of the difference between two frequency components/the sum of two frequency components. In this case, the above expression may be also used for in-focus judgment.

A ninth embodiment of the present invention will be explained.

Figure 30:
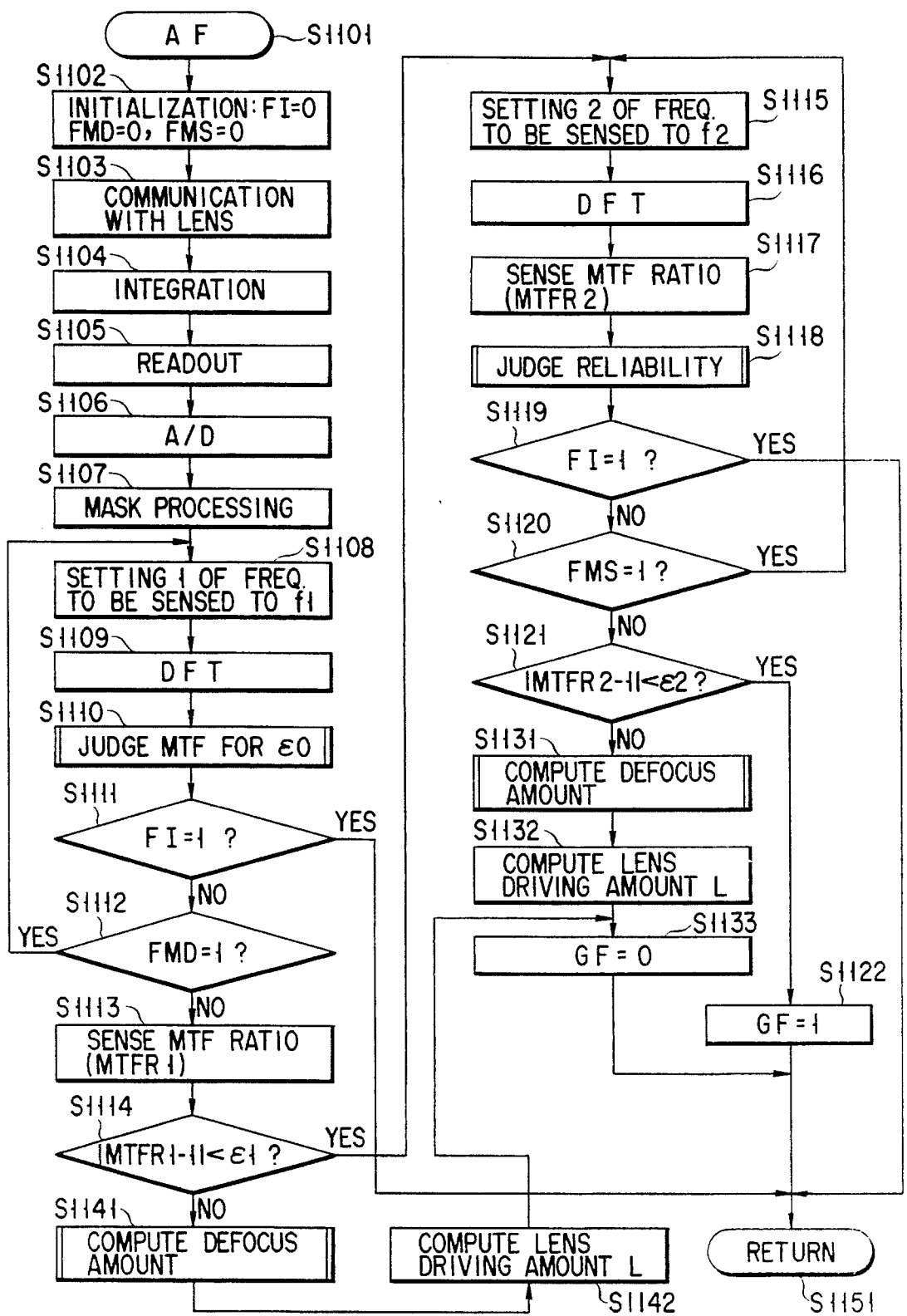
FIG. 30 shows the sequence of the subroutine program AF in a ninth embodiment of the present invention.

FIG. 30 shows the sequence of the subroutine program AF. This embodiment is such that a judgment of MFT value is added to the FIG. 25 subroutine program of the eighth embodiment. Specifically, steps S1110 and S1112 are added to the subroutine program AF of FIG. 25.

When the subroutine program AF is started (step S1101), initialization is first carried out (step S1102). Then, communication with the lens section is made for lens information including frequency, lens position, opening, state judgment, and sensing defocus range (step S1103).

Then, the output of the sensor 302 is integrated (step S1104). After integration, the sensor signal is read out (step S1105), A–D converted into digital data for storage (step S1106), and undergoes mask processing (both ends of specific areas extracted from consecutive images are processed with a mask of Gaussian function or the like) (step S1107).

Setting 1 of frequency to be sensed is done by executing the subroutine of setting the frequency to be sensed to f1 (step S1108). The initial value of fa is selected from f10, f11, and f12 in FIG. 7 in the subroutine program. The frequency f1 is sensed by performing digital processing (DFT) (step S1109).

Then, after the sensed frequency (the judgment of MTF value) has been compared with a specific value $\in 0$ (step S1110), the interruption (first release OFF) flag FI is judged (step S1111). When FI=1 (an interruption has occurred), flow goes to step S1151. When FI=0 (no interruption has occurred), the flag FMD is judged (step S1112). When FMD=1 (the sensed frequency is less than a specific value), flow returns to step S1108. When FMD=0 (the sensed frequency is larger than a specific value), the ratio (MTFR1) of frequency components from two sensors with a specific optical path difference is sensed (step S1113).

Then, the MTFR1 is compared with the specific value $\in 1$ (step S1114). When $|MTFR-1| < \in 1$ is false, the table in which the MTFR1 and the defocus amount at the frequency f1 of the lens 301 are stored is referred to, and the defocus amount is interpolated for correction (step S1141). Then, based on the defocus amount, the driving amount L of the lens 301 is computed (step S1142).

When $|MTFR-1| < \in 1$ is true, this means that the lens 301 is already in the vicinity of the in-focus point. Therefore, to raise the in-focus sensing accuracy, setting 2 of the frequency to be sensed is done, that is, the frequency to be sensed is changed from f1 to a higher frequency f2 (f2 is such a frequency that the interval between two sensors may be less than Z0 in the lens frequency component versus defocus amount characteristics in FIG. 7). The initial value of fa is f2.

Then, after the frequency f2 has been sensed by digital processing (DFT) (step S1116), the ratio (MTRF2) of frequency components from two sensors with a specific optical path difference is sensed (step S1117). Next, at step S1118, the reliability of the ratio of sensed frequency components is evaluated. In this case, the evaluation frequency Ft uses a specific value C of 1.2 to 2.5.

Then, the interruption (first release OFF) flag FI is judged (step S1119). When FI=1 (an interruption has occurred), flow goes to step S1151, whereas when FI=0 (no interruption has occurred), the flag FMS is judged (step S1120). When FMS=1 (the reliability of the sensed frequency ratio MTFR 2 is unacceptable), flow returns to step S1115 to change the frequency f2 (to a lower frequency).

When FMS=0 (the reliability of the sensed frequency ratio is acceptable), the MTFR2 is compared with the specific value $\in 2$ for in-focus judgment (step S1121). When $|MTFR-2| < \in 2$ is false, the table in which MTFR2 and the defocus amount at the frequency f2 of the lens 301 are stored is referred to, and the defocus amount is interpolated for correction (step S1131). Then, based on the defocus amount, the driving amount L of the lens 301 is computed (step S1132).

When $|MTFT-2| < \in 2$ is true, this means that the lens 301 is already in the in-focus range, and then the in-focus flag GF is set to GF=1 (step S1122). When the lens is in the out-of-focus range, the in-focus flag is set to GF=0 (step S1133). After this, the subroutine program AF is terminated (step S1151).

Figure 31:
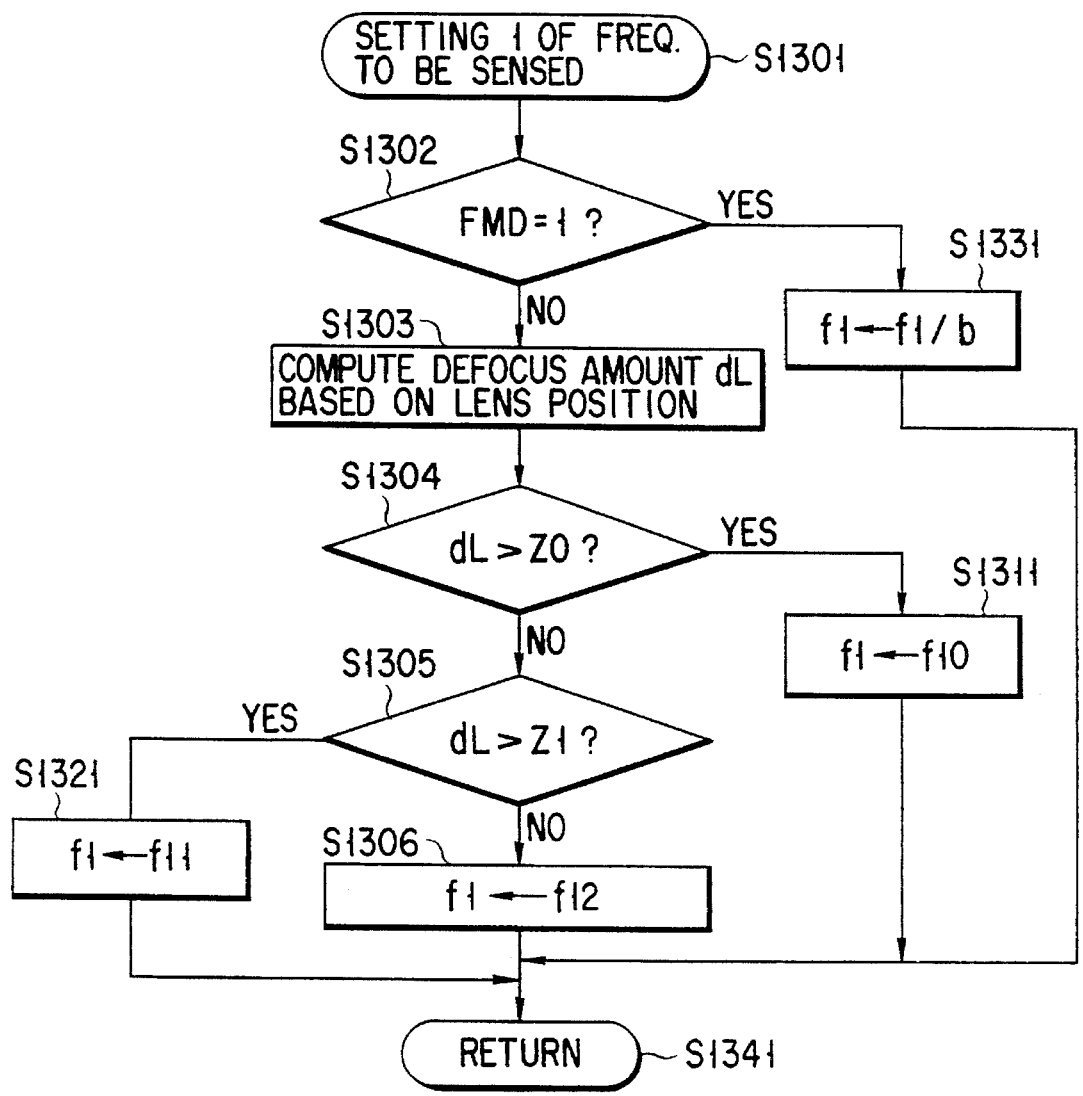
FIG. 31 is a flowchart for the setting 1 of the frequency to be sensed in FIG. 30.

Referring to FIG. 31, setting 1 of the frequency to be sensed will be explained.

When the subroutine for setting 1 is started (step S1301), the flag FMD is judged (step S1302). When FMD=1, f1/b is substituted into f1 (b: a specific integer value). and flow goes to step 1341 (step S1331).

When FMD=1 is false, the defocus amount dL to be sensed is computed from the present position of the lens (step 1303). Then, it is judged whether the defocus amount dL is larger than Z0 (see FIG. 7) (step S1304). When dL>Z0 is true, f10 is substituted into f1 (see FIG. 7), and then flow goes to step S1341 (step S1311).

When dL>Z0 is false, it is judged whether the defocus amount dL is larger than Z1 (see FIG. 7) (step S1305). When dL>Z1 is true, f11 is substituted into f1 (see FIG. 7), and then flow goes to step S1341 (step S1321).

When dL>Z1 is false, f12 is substituted into f1 (step S1306), and then the present sequence is terminated (step S1341).

FIG. 34 shows the sequence of setting 2 of the frequency to be sensed in this embodiment. This sequence is such that the step of judging whether or not FMD=1 holds is added to the sequence of FIG. 28.

FIG. 32 shows the flow of judging MTF value.

When the program is started (step S1401), the signal MTFs, the smaller of the sensed frequency components from two sensors is compared with the specific value $\in 0$ (step S1402). When MTFs<$\in 0$ is true, the FMD flag is set to FMD=1 (step S1404).

When MTFs<$\in 0$ is false, the MFD flag is set to FMD=0 (step S1403). Then, this sequence is terminated (step S1405).

With this arrangement, it is possible to provide a fast, simple, highly accurate in-focus sensing device that always monitors the in-focus state at the frequency component ratio different from the ratio of the sensed frequency and its absolute value.

While in this embodiment, DFT processing is done in frequency sensing, other forms of processing such as digital filters or analog filters may be used as long as they can sense a narrow frequency band.

In the embodiment, the switching of the frequency to be sensed is done twice. The sensing of frequency components may be done by parallel processing and the frequencies to be sensed be changed several times.

Other optical path length changing means may be used. For example, the lens may be driven in a time-sharing manner to change the optical path length.

Sensors are placed on two planes in the embodiment. They may be placed on more than two planes as shown in FIGS. 20A and 20B.

Figure 33:
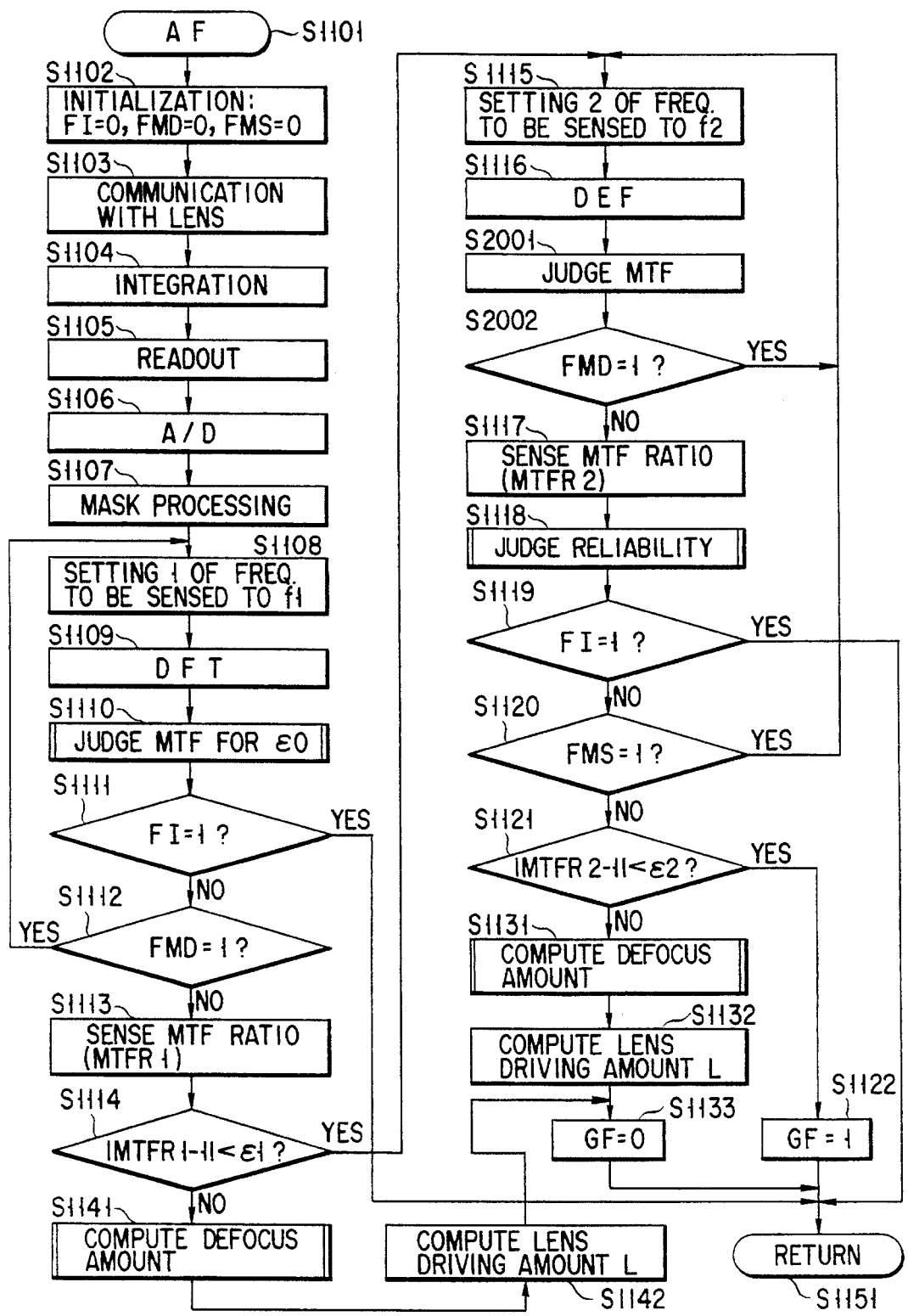
FIG. 33 is a flowchart of a modified sequence of FIG. 30.

The reliability may be increased by combining the absolute value of the sensed frequency and the sensed frequency component ratio, as shown in FIG. 33 where the step of judging the MTF value is inserted between steps S1116 and S1117 in FIG. 30.

As described above in detail, according to the seventh to ninth embodiments, in-focus sensing and evaluation of reliability are carried out using the same image signals by a method of extracting space frequency components from two image signals with different in-focus states and computing the in-focus point based on the frequency component ratio. Therefore, it is possible to provide a high-speed, high-accuracy in-focus sensing device.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An in-focus state sensing device for a camera, comprising:

an optical system for directing luminous fluxes from a subject;

two optoelectric transducers arranged for receiving luminous fluxes passing through the optical system at a first position and at a second position, respectively, and for converting an optical distribution of the respective luminous fluxes received at said first and second positions into respective electrical distribution outputs, the two optoelectric transducers being provided at the first and second positions, respectively, and wherein the first and second positions are different from each other;

frequency extracting means for extracting specific frequency components corresponding to the first and second positions, respectively, based on each respective electrical distribution output of the two optoelectric transducers;

frequency component ratio sensing means for obtaining a ratio of said frequency components extracted by said frequency extracting means, and for producing a ratio output signal corresponding to the obtained ratio;

defocus amount computing means for obtaining a defocus amount for the optical system based on the ratio output signal produced by the frequency component ratio sensing means;

driving means for driving the optical system based on the defocus amount obtained by the defocus amount computing means;

judging means for judging whether or not the optical system is in the vicinity of an in-focus position based on the ratio output signal; and frequency switching means for setting a first frequency as a specific frequency component to be extracted by the frequency extracting means, and for setting a second frequency as a specific frequency component to be extracted by the frequency extracting means when said judging means judges, based on the ratio output signal, that the optical system is in the vicinity of the in-focus position.

2. An in-focus sensing device according to claim 1, wherein the frequency switching means includes means for switching the specific frequency from the first frequency to the second frequency higher than the first frequency, when the frequency ratio for the first frequency has reached a value corresponding to one of those in the vicinity of the in-focus point.

3. An in-focus sensing device according to claim 1, wherein the frequency switching means includes means for switching the specific frequency from the first frequency to the second frequency lower than the first frequency, when the frequency ratio for the first frequency is below a specified value.

4. An in-focus state sensing device for a camera, comprising:

an optical system for forming a subject image, the optical system having a focal surface;

two optoelectric transducers, respectively arranged at two adjacent positions which are conjugated with the focal surface of the optical system, for converting the subject image formed by the optical system into respective optoelectric conversion signals;

frequency component ratio sensing means for extracting frequency components in an equal band from the two optoelectric conversion signals from the two optoelectric transducers, respectively, for obtaining a ratio of the two extracted frequency components based on the extracted two frequency components, and for producing a ratio output signal corresponding to the obtained ratio;

defocus amount sensing means for obtaining a defocus amount based on the ratio output signal of the frequency component ratio sensing means, and for producing an output corresponding to the obtained defocus amount;

driving means for driving the optical system based on the output of the defocus amount sensing means; and judging means for judging whether or not the optical system is in the vicinity of the in-focus position based on the ratio output signal;

switching means for changing the band of the frequency components extracted by the frequency component ratio sensing means, responsive to a judging result obtained by the judging means based on the ratio output signal, as a function of whether the optical system is in the vicinity of or away from an in-focus position.

5. An in-focus state sensing device for a camera, comprising:

an imaging lens;

sensor means for receiving a subject image through the imaging lens at adjacent two positions which are conjugated with a focal surface, and for producing two respective optoelectric conversion analog signals;

analog-to-digital conversion means for converting the optoelectric conversion analog signals from the sensor means into respective digital output signals;

Discrete Fourier Transform means for receiving the digital output signals from the analog-to-digital conversion means, and for computing two specific frequency components of the optoelectric conversion analog signals at the two positions by Fourier transform, respectively, and for outputting the two computed specific frequency components;

memory means for storing the two specific frequency components computed by the Discrete Fourier Transform means;

control means for computing a ratio of the two specific frequency components which are computed by the Discrete Fourier Transform means and stored in the memory means, for obtaining a defocus amount based on the computed ratio, for judging whether or not the imaging lens is in a vicinity of an in-focus position based on the defocus amount which in turn was obtained based on the computed ratio, and, responsive to said judging, for changing the frequency to be sensed by the Discrete Fourier Transform means so that when the imaging lens is in a vicinity of an in-focus position, specific high-frequency components are sensed by the Discrete Fourier Transform means, and when the imaging lens is away from the vicinity of the in-focus position, specific low-frequency components are sensed by the Discrete Fourier Transform means; and lens-driving means for driving the imaging lens based on the defocus amount obtained by the control means.

6. An in-focus state sensing device for a camera, comprising:

a pair of optoelectric transducers, each arranged at a respective position near a focal conjugate surface of an imaging optical system, and for respectively optoelectrically converting an optical distribution of a subject at said positions, and for producing respective converted signals;

frequency component extracting means for extracting specific frequency components from the respective converted signals from the pair of optoelectric transducers, and for outputting the respective specific frequency components so as to respectively correspond to the two positions;

frequency component ratio sensing means for obtaining a ratio of the specific frequency components which correspond to the two respective positions, extracted at the frequency component extracting means, and for producing a ratio output signal;

converting means for converting the frequency component ratio represented by the ratio output signal from the frequency component ratio sensing means into a defocus amount for the imaging optical system; and lens driving means for driving the imaging lens based on the defocus amount from the converting means; and wherein the frequency component extracting means uses as the specific frequency a first frequency component able to cover a wide defocus range in an initial stage of an in-focus state sensing operation and judges, based on the defocus amount, whether or not the imaging optical system is in the vicinity of the in-focus position, and when it is judged that the imaging optical system has reached the vicinity of the in-focus position, the frequency component extracting means uses as the specific frequency a second frequency component with a higher sensing accuracy.

7. An in-focus state sensing device for a camera, comprising:

first and second optoelectric transducers for optoelectrically converting two optical distributions of a subject with different focal states, near a focal conjugate surface of an imaging lens, and for respectively producing first and second optoelectric conversion signals;

frequency component extracting means for extracting specific frequency components from the first and second optoelectric conversion signals, respectively;

frequency component ratio sensing means for obtaining a ratio of the frequency components using the respective frequency components extracted by the frequency component extracting means, and for producing a frequency component ratio output signal;

converting means for converting the frequency component ratio represented by the ratio output signal from the frequency component ratio sensing means into a defocus amount for the imaging lens; and lens driving means for driving the imaging lens based on the defocus amount from the converting means; and wherein the frequency component extracting means includes means for selecting from more than one frequency to be sensed a frequency able to cover a wide defocus range in an initial stage of an in-focus state sensing operation, and after having reached the vicinity of the in-focus position, as judged based on the defocus amount, changing the frequencies to be sensed based on the frequency component ratio output signal from the frequency component ratio sensing means.

8. A method of sensing an in-focus condition in a camera, comprising the steps of:

optoelectrically converting a subject image at two adjacent positions which are conjugated with a focal surface, respectively, and for producing respective optoelectric conversion signals;

obtaining specific frequency components of the optoelectric conversion signals;

obtaining a ratio of the obtained specific frequency components of the optoelectric conversion signals;

judging whether or not the obtained ratio is within a specific range;

obtaining specific frequency components of higher frequencies when the obtained ratio is judged to be within a specified range, and for obtaining a frequency component ratio of the obtained higher frequencies; and judging that the camera is in an in-focus condition when the frequency component ratio of higher frequencies is within a specified range.

9. An in-focus condition sensing device for a camera, comprising:

an imaging lens;

frequency component ratio sensing means for optoelectrically converting a subject image passing through the imaging lens in two places to produce respective converted signals, for sensing specific frequency components of the respective converted signals, and for obtaining a ratio of the sensed specific frequency components of the converted signals;

defocus amount computing means for computing a defocus amount by an equation using the specific frequency component ratio obtained by the frequency component ratio sensing means, and wherein the contents of the equation when the specific frequency component ratio is in a specified range differ from those when the specific frequency component ratio is out of the specified range; and driving means for driving the imaging lens based on the defocus amount computed by the defocus amount computing means.

10. An in-focus state sensing device for a camera, comprising:

an optical system for directing luminous fluxes from a subject;

optoelectric transducer means for converting the luminous fluxes passing through the optical system at a plurality of positions with different optical path lengths, into respective electric signals responsive to an optical distribution of the luminous fluxes, in accordance with the respective positions;

frequency extracting means for extracting specific frequency components, based on the electric signals which are output from the optoelectric transducer means and which correspond to the positions, respectively;

frequency component ratio sensing means for obtaining a ratio of two frequency components which are output from the frequency extracting means and which have different associated path lengths, and for producing a ratio output signal;

defocus amount computing means for obtaining a defocus amount for the optical system based on the ratio represented by the ratio output signal from the frequency component ratio sensing means;

driving means for driving the optical system based on the defocus amount from the defocus amount computing means;

judging means for judging whether or not the optical system is in the vicinity of the in-focus position based on a first frequency which is set as a specific frequency at the frequency extracting means; and frequency switching means for setting a second frequency as the specific frequency when the judging means, based on the ratio output signal and the first frequency, judges that the optical system has reached the vicinity of the in-focus position.

* * * * *